United States Patent
Shimomura et al.

(10) Patent No.: US 11,287,762 B2
(45) Date of Patent: Mar. 29, 2022

(54) IMAGE FORMING APPARATUS AND IMAGE FORMING METHOD

(71) Applicant: CANON KABUSHIKI KAISHA, Tokyo (JP)

(72) Inventors: Masaki Shimomura, Suntou-gun (JP); Yoshiki Kudo, Mishima (JP); Hiroshi Kita, Mishima (JP); Kazuhiro Funatani, Mishima (JP); Keita Sato, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/198,550

(22) Filed: Mar. 11, 2021

(65) Prior Publication Data

US 2021/0263443 A1 Aug. 26, 2021

Related U.S. Application Data

(63) Continuation of application No. 16/728,421, filed on Dec. 27, 2019, now Pat. No. 10,962,899, which is a
(Continued)

(30) Foreign Application Priority Data

Nov. 20, 2017 (JP) .............................. JP2017-223072

(51) Int. Cl.
*G03G 15/08* (2006.01)
*G03G 15/16* (2006.01)
(Continued)

(52) U.S. Cl.
CPC ....... *G03G 15/0808* (2013.01); *G03G 15/105* (2013.01); *G03G 15/1615* (2013.01);
(Continued)

(58) Field of Classification Search
CPC ............. G03G 15/0808; G03G 15/105; G03G 15/1615; G03G 15/5008; G03G 15/5054;
(Continued)

(56) References Cited

U.S. PATENT DOCUMENTS 6,115,561 A * 9/2000 Fukushima ........ G03G 15/0855
399/49
6,633,734 B2 10/2003 Maebashi et al.
(Continued)

FOREIGN PATENT DOCUMENTS

CN 101445192 A 6/2009
CN 105278288 A 1/2016
(Continued)

OTHER PUBLICATIONS

Office Action dated Jul. 14, 2021, in issued Chinese Patent Application No. 201811356195.8.

*Primary Examiner* — Joseph S Wong
(74) *Attorney, Agent, or Firm* — Venable LLP

(57) ABSTRACT

Downtime relating to formation and detection of a detection image is reduced. An image forming apparatus includes a controller configured to calculate a first conversion unit to convert a gradation of input image data so that density output for the input image data becomes a first density output characteristic based on a first detection result of the detection image detected by a density sensor in a first mode. The controller generates a second conversion unit to convert the gradation of the input image data so that the density output for the input image data becomes a second density output characteristic in a second mode based on the detection result in the first mode and correction information, and further updates the correction information based on a second
(Continued)

detection result of the detection image detected by the density sensor in the second mode and the first detection result.

3 Claims, 14 Drawing Sheets

Related U.S. Application Data continuation of application No. 16/194,811, filed on Nov. 19, 2018, now Pat. No. 10,539,907.

(51) Int. Cl.
*G03G 15/10* (2006.01)
*G03G 15/00* (2006.01)

(52) U.S. Cl.
CPC ..... *G03G 15/5008* (2013.01); *G03G 15/5054* (2013.01); *G03G 15/5058* (2013.01); *G03G 15/5062* (2013.01); *G03G 15/55* (2013.01); G03G 15/5087 (2013.01); G03G 2215/00029 (2013.01); G03G 2215/00037 (2013.01); G03G 2215/00042 (2013.01); G03G 2215/00059 (2013.01); G03G 2215/00067 (2013.01)

(58) Field of Classification Search
CPC ........... G03G 15/5058; G03G 15/5062; G03G 15/55; G03G 15/5087; G03G 2215/00029; G03G 2215/00037; G03G 2215/00042; G03G 2215/00059; G03G 2215/00067
See application file for complete search history.

(56) References Cited

U.S. PATENT DOCUMENTS

| | | | |
|---|---|---|---|
| 9,665,043 B2 | 5/2017 | Funatani et al. | |
| 10,289,046 B2 | 5/2019 | Ikeda et al. | |
| 10,488,784 B2 | 11/2019 | Yamada | |
| 2003/0118361 A1* | 6/2003 | Shimmura | G03G 15/104 |
| | | | 399/49 |
| 2016/0011539 A1 | 1/2016 | Ishida et al. | |
| 2017/0102653 A1 | 4/2017 | Yoshioka et al. | |
| 2017/0285546 A1 | 10/2017 | Saito et al. | |
| 2019/0018355 A1 | 1/2019 | Kudo et al. | |
| 2019/0086833 A1 | 3/2019 | Yamada | |

FOREIGN PATENT DOCUMENTS

| | | |
|---|---|---|
| CN | 106842854 A | 6/2017 |
| JP | 08-227222 A | 9/1996 |
| JP | 2002-236402 A | 8/2002 |

* cited by examiner

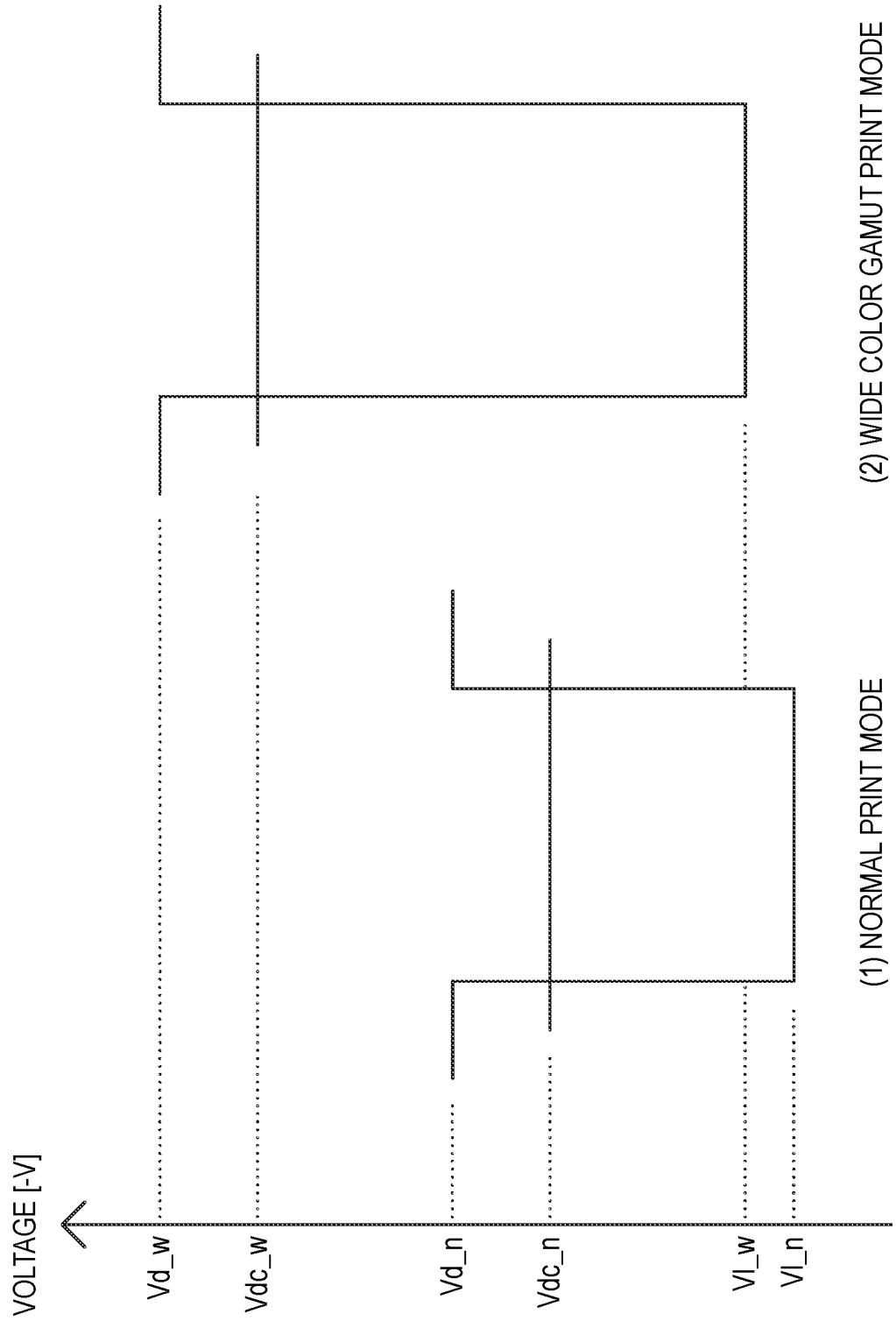

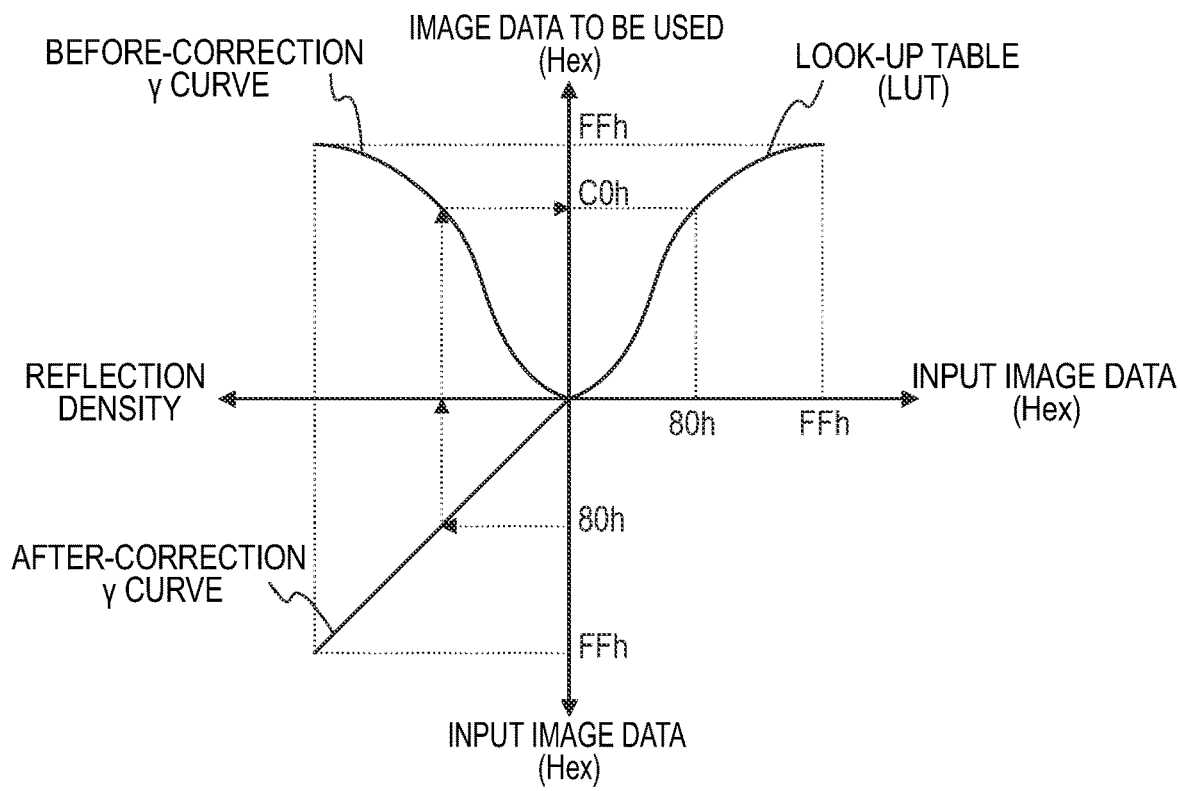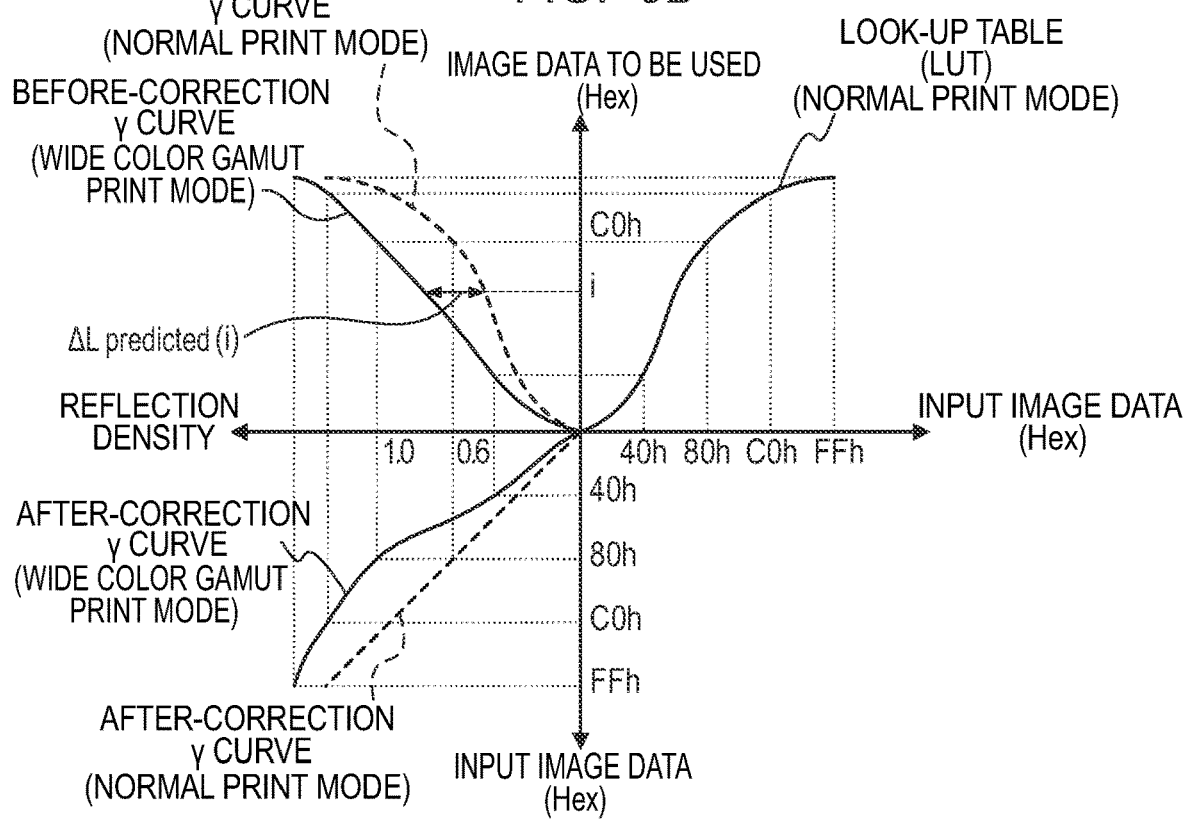

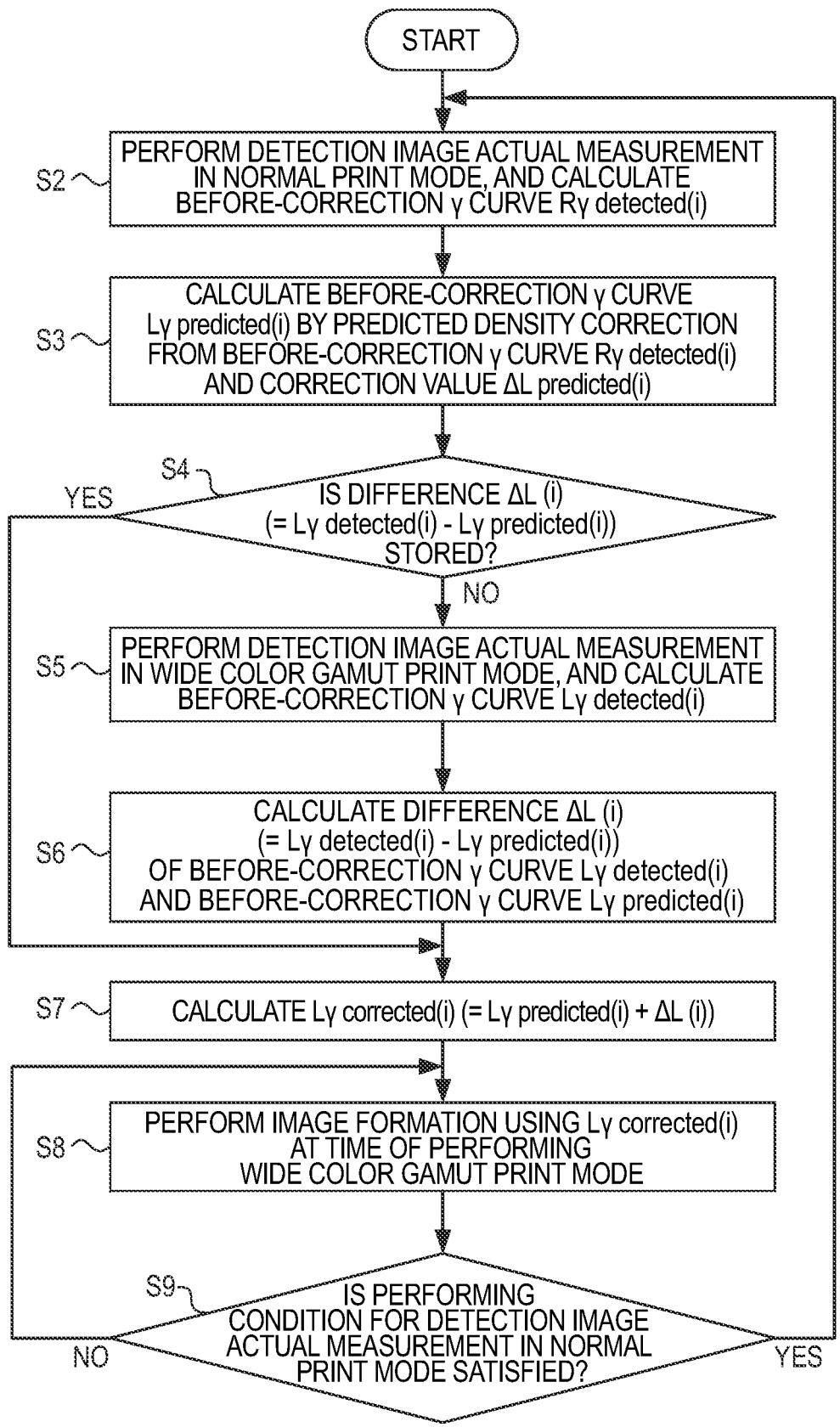

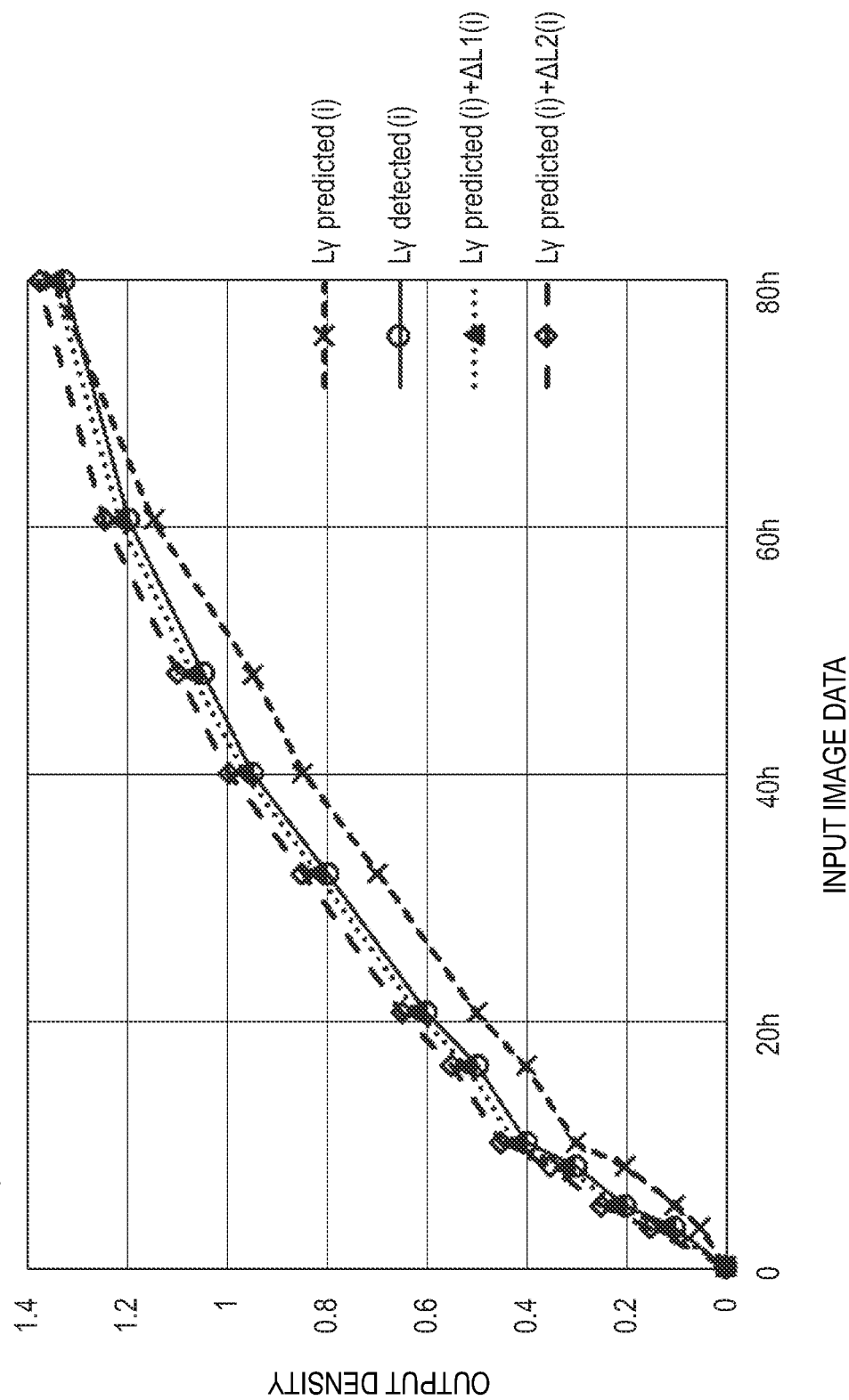

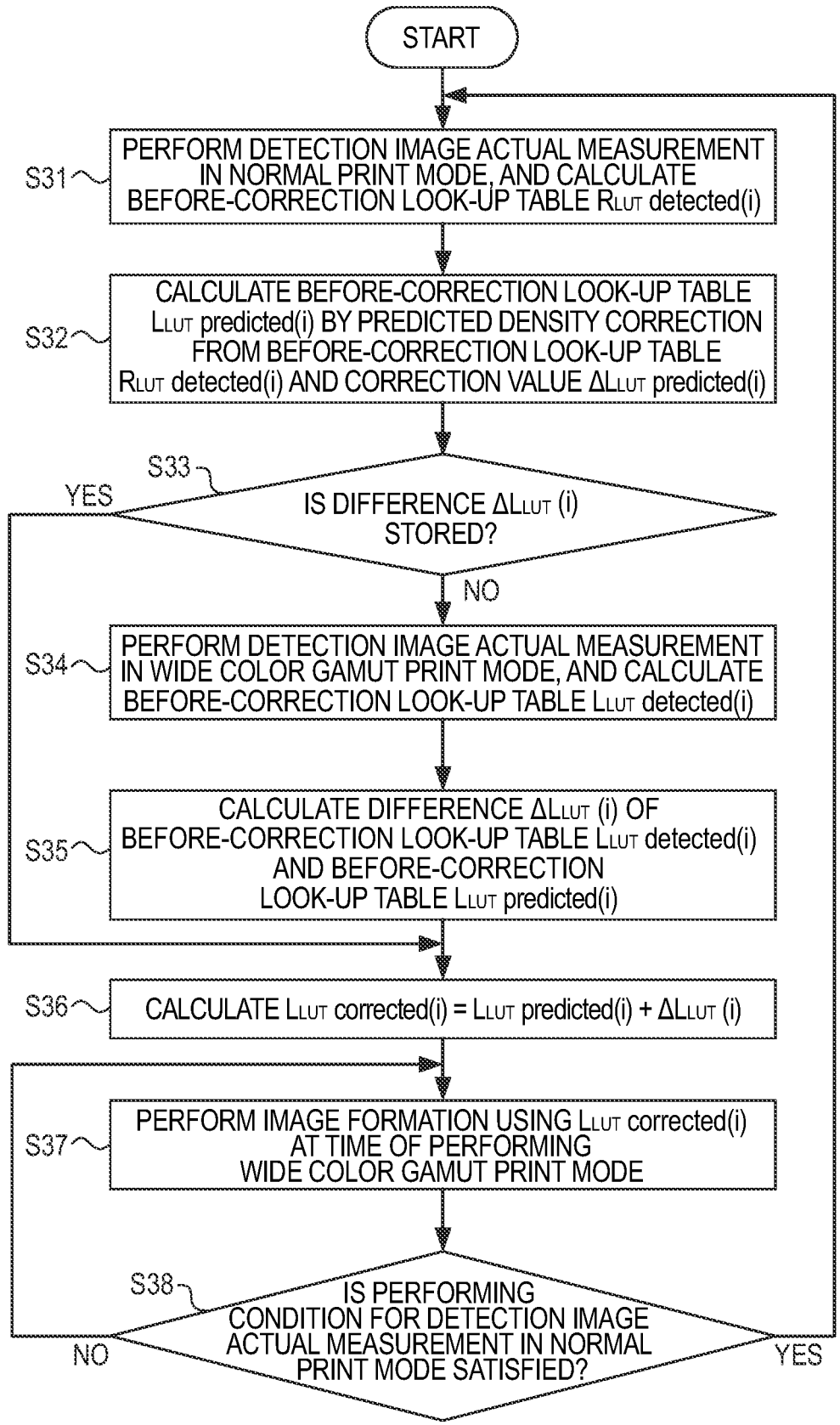

IMAGE FORMING APPARATUS AND IMAGE FORMING METHOD

BACKGROUND

Field of the Disclosure

The present disclosure relates to an image forming apparatus and an image forming method, and more particularly, to an image forming apparatus having a variable density image formation mode of controlling a supply amount of developer to be supplied to an image bearing member by a developer supply member.

Description of the Related Art

In a field of image forming apparatus, there is used a γ curve obtained by expressing a correlation between an input image signal and a density of an output image corresponding to the input image signal as a curved line. There is also known a so-called look-up table configured to convert a gradation of the input image signal so as to obtain linear density characteristics of the output image with respect to the input image signal. Correction using this look-up table is referred to as so-called "γ correction". In addition, there is known a method in which, when the γ curve collapses due to, for example, an operating environment and a continuous operation time of the image forming apparatus, the image forming apparatus forms a detection image on a belt and recreates a γ curve to correct the look-up table (see, for example, Japanese Patent Application Laid-Open No. H08-227222).

In recent years, there has been a demand for image forming apparatus exhibiting further improved image quality, and improved color gamut is one of indicators thereof. The color gamut in the image forming apparatus refers to a color reproduction range that can be output by the image forming apparatus, and means that, as the color gamut becomes wider, the color reproduction range becomes wider and superiority of the image forming apparatus increases. For example, a method of increasing a developer amount on a recording material is conceivable as one method of expanding the color gamut. In Japanese Patent Application Laid-Open No. H08-227222, there is disclosed a proposal for adjusting a color impression of a secondary color by changing a rotation speed of a developing roller. The configuration of Japanese Patent Application Laid-Open No. H08-227222 has an object to adjust the color impression, and is not intended to increase the developer amount on the recording material, but this technology can be utilized to expand the color gamut. That is, it is possible to increase the developer amount by increasing the rotation speed of the developing roller.

However, the related art has the following problem in terms of formation of the detection image. When the rotation speed of the developing roller and other such process conditions are changed, it is required to form and detect the detection image for each of the process conditions. However, downtime increases when the detection image is formed and detected for each process condition each time the process condition is changed.

SUMMARY

In order to solve the above-mentioned problem, according to one embodiment of the present disclosure, there is provided an image forming apparatus, comprising:

a photosensitive drum;
a developing roller configured to develop an electrostatic latent image on the photosensitive drum with a toner to form a toner image;
a belt onto which the toner image formed on the photosensitive drum is to be transferred or on which a recording material, onto which the toner image is to be transferred, is borne;
a detector configured to detect a density of a detection image formed on the belt, wherein the image forming apparatus is configured to perform an image formation in a first mode in which a circumferential speed difference of a circumferential speed of the developing roller with respect to a circumferential speed of the photosensitive drum is a first circumferential speed difference and in a second mode in which the circumferential speed difference is larger than the first circumferential speed difference;
a controller configured to calculate a first conversion unit configured to convert a gradation of an input image data so that a density output for the input image data becomes a first density output characteristic based on a first detection result of the detection image detected by the detector in the first mode; and
a storage,
wherein the controller is configured to generate a second conversion unit configured to convert the gradation of the input image data so that the density output for the input image data becomes a second density output characteristic in the second mode based on the detection result in the first mode and correction information, and
wherein the controller is configured to further update the correction information based on a second detection result of the detection image detected by the detector in the second mode and the first detection result.

According to another embodiment of the present disclosure, there is provided an image forming apparatus, comprising:

a photosensitive drum;
a developing roller configured to develop an electrostatic latent image on the photosensitive drum with a toner to form a toner image;
a belt onto which the toner image formed on the photosensitive drum is to be transferred or on which a recording material, onto which the toner image is to be transferred, is borne;
a detector configured to detect a density of a detection image formed on the belt;
a controller configured to perform a first detection image actual measurement for obtaining a first characteristic indicating a relationship between an input image data in a first mode and a density corresponding to the input image data based on a result of detecting the density of the detection image by the detector in the first mode; and
a storage,
wherein the controller is configured to perform a predicted density correction for predicting, based on the first characteristic, a characteristic indicating a relationship between an input image data in a second mode in which an image formation is performed with a color gamut different from a color gamut in the first mode and the density corresponding to the input image data, and perform an image formation in the second mode by using a predicted characteristic, wherein the controller is configured to perform a second detection image actual measurement for obtaining a second characteristic indicating a relationship between the input image data in the second mode and the density corresponding to the input image data based on a result of detecting the density of the detection image by the detector in the second mode, obtain a correction value based on the second characteristic and the predicted characteristic, and correct the predicted characteristic by using an obtained correction value while storing the obtained correction value in the storage, and wherein the controller is configured to further correct the predicted characteristic by using the obtained correction value stored in the storage without performing the second detection image actual measurement.

Further features of the present disclosure will become apparent from the following description of exemplary embodiments with reference to the attached drawings.

BRIEF DESCRIPTION OF THE DRAWINGS

FIG. 3 is a schematic explanatory graph of a surface potential of the photosensitive drum in the first embodiment to be disclosed.

FIG. 6A is a schematic explanatory graph of a look-up table at the time of a normal print mode in the first embodiment to be disclosed.

FIG. 6B is a schematic explanatory graph of a look-up table at the time of a wide color gamut print mode.

FIG. 10 is a flow chart for illustrating a control method for density correction in the first embodiment to be disclosed.

FIG. 13 is a graph for showing a γ curve obtained by verification in the second embodiment to be disclosed.

FIG. 14 is a flow chart for illustrating a control method for density correction in the third embodiment to be disclosed.

DESCRIPTION OF THE EMBODIMENTS

Now, modes for carrying out the present disclosure will be described as embodiments with reference to the accompanying drawings.

First Embodiment

[Image Forming Apparatus]

Figure 1:
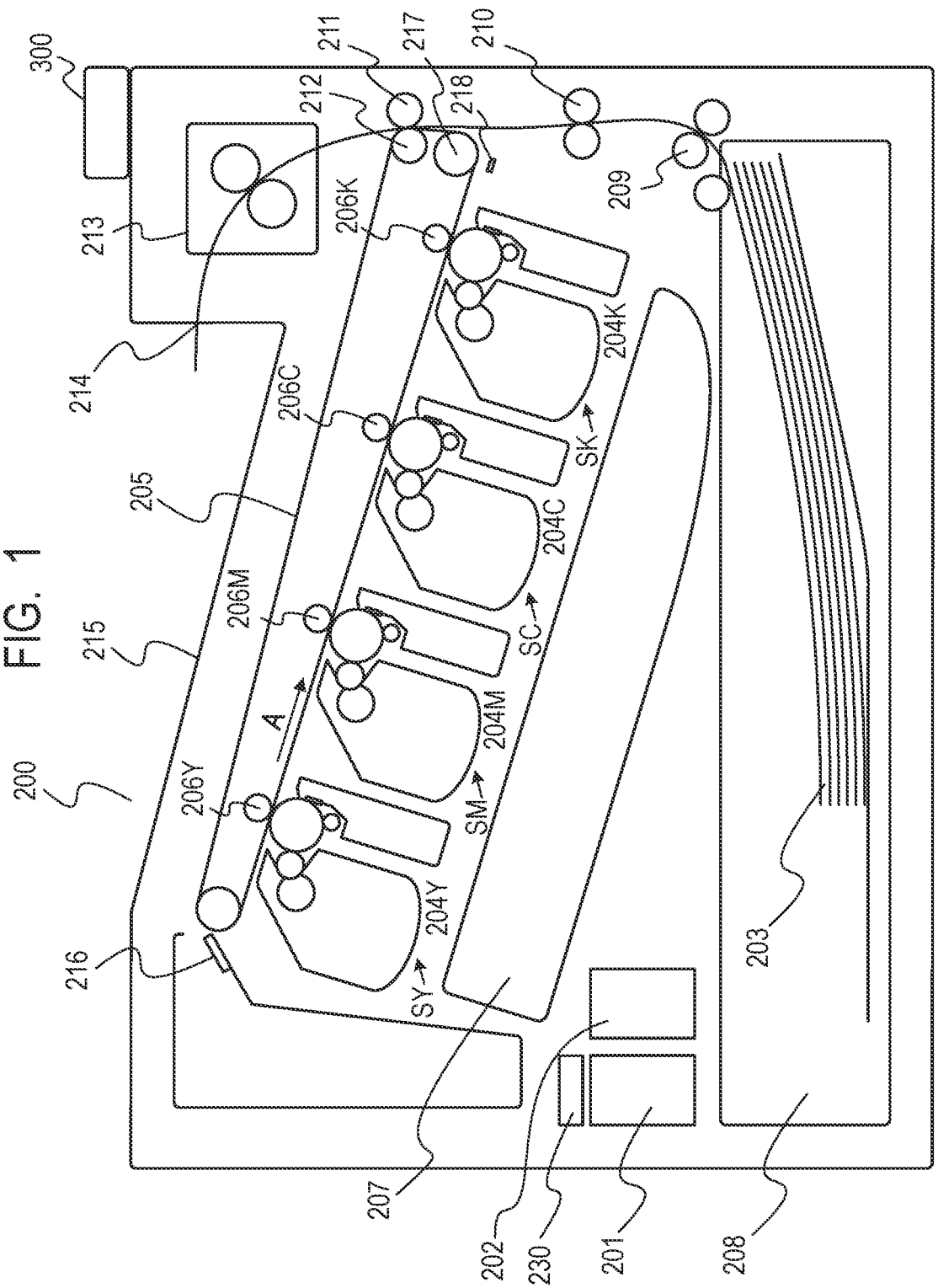
FIG. 1 is a schematic configuration diagram of an image forming apparatus according to a first embodiment and a second embodiment of the present disclosure to be disclosed.

FIG. 1 is a schematic configuration diagram of an image forming apparatus 200 according to a first embodiment of the present disclosure. The image forming apparatus 200 is a full-color laser printer that employs an in-line system and an intermediate transfer system. The image forming apparatus 200 is also an image forming apparatus capable of forming an image in a normal print mode being a first mode and in a wide color gamut print mode being a second mode using a color gamut different from a color gamut in the normal print mode. The image forming apparatus 200 forms a full-color image on a recording material 203 serving as a transfer material based on image information input from a host computer (hereinafter referred to as "host PC") (not shown) to an engine controller 202 via a controller 201. The image forming apparatus 200 includes a nonvolatile memory 230 serving as a storage, and the controller 201 stores information including a difference ΔL(i), which is described later, in the nonvolatile memory 230.

Figure 2A:
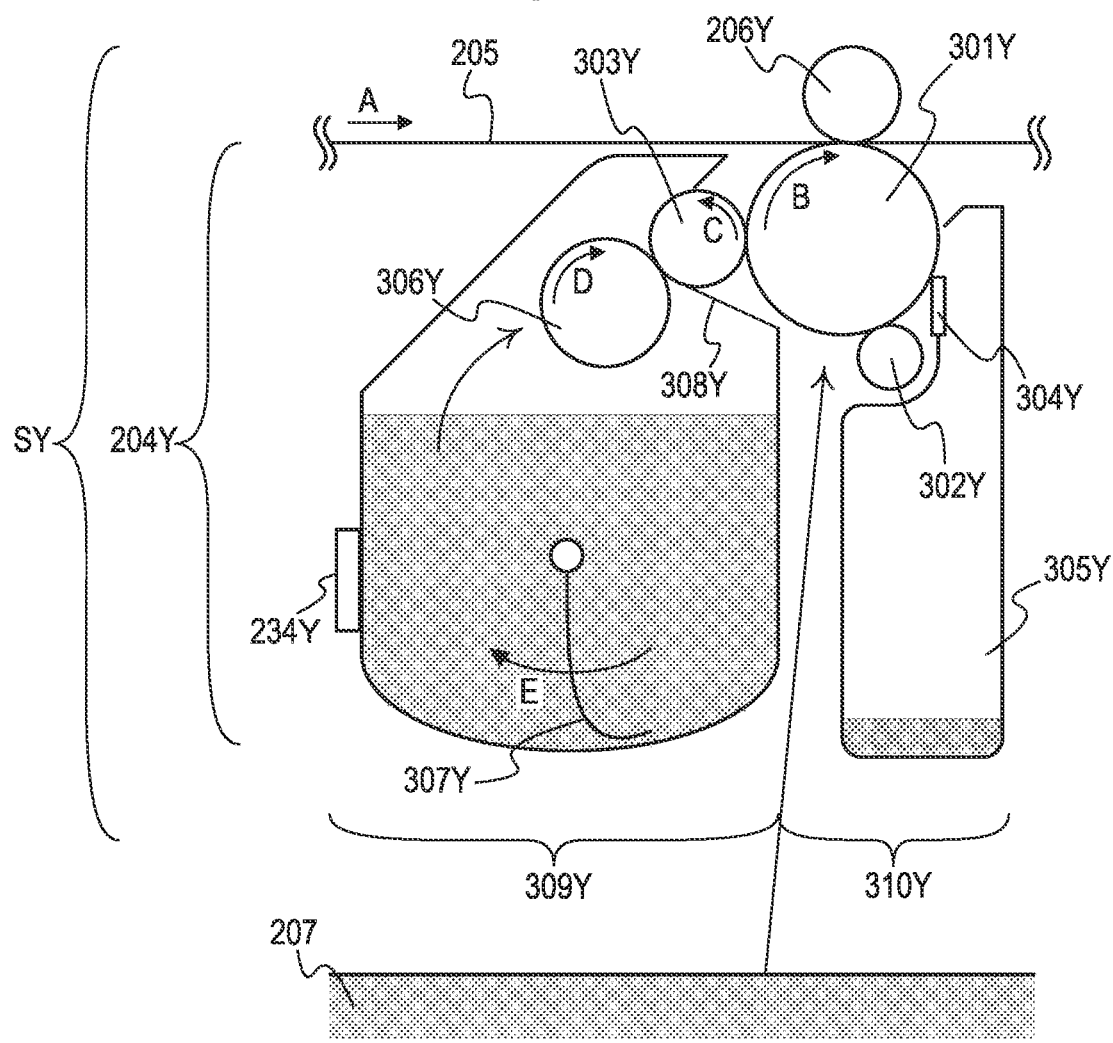
FIG. 2A is a schematic configuration diagram of an image forming station in each of the first embodiment and the second embodiment to be disclosed.

The image forming apparatus 200 includes image forming stations SY, SM, SC, and SK for respective colors. As an example, the image forming station SY for yellow is illustrated in FIG. 2A. The image forming station SY includes a process cartridge 204Y, an intermediate transfer belt 205 configured to be rotated in an arrow-A direction illustrated in FIG. 2A, and a primary transfer roller 206Y arranged on a side opposite to the process cartridge 204Y across the intermediate transfer belt 205. The arrow-A direction illustrated in FIG. 2A is hereinafter referred to as "rotation direction A". The process cartridge 204Y includes a nonvolatile memory 234Y The nonvolatile memory 234Y stores, for example, a current use amount of a toner (hereinafter referred to as "toner use amount"), a current use amount of the drum unit 310, or other such pieces of information. Those pieces of information stored in the nonvolatile memory 234Y are successively updated each time printing is performed. The respective image forming stations SY, SM, SC, and SK are arranged in alignment with each other in the rotation direction A of the intermediate transfer belt 205, and are substantially the same as one another except for the color of an image to be formed. Therefore, unless otherwise distinguished from one another, the respective image forming stations SY, SM, SC, and SK are collectively described by omitting the suffixes Y, M, C, and K each indicating that the component is provided for the corresponding color.

The process cartridge 204 includes a photosensitive drum 301 serving as an image bearing member. The photosensitive drum 301 is rotationally driven in an arrow-B direction illustrated in FIG. 2A by a drive unit (not shown). A charging roller 302 has a high voltage applied by a high-voltage power supply (not shown), to thereby uniformly charge the surface of the photosensitive drum 301. Then, a scanner unit 207 serving as an exposure unit irradiates the photosensitive drum 301 with laser light based on the image information input to the engine controller 202, to thereby form an electrostatic latent image on the surface of the photosensitive drum 301. A developing roller 303 serving as a developer supply unit is rotated in an arrow-C direction illustrated in FIG. 2A by a drive unit (not shown). Toner serving as developer, which has been charged to coat the surface of developing roller 303, adheres along the electrostatic latent image on the surface of the photosensitive drum 301, to thereby cause the electrostatic latent image to become a visible image. In the following description, the visible image based on the toner is referred to as "toner image".

A base layer of the photosensitive drum 301 is grounded, and a voltage having a polarity reverse to that of the toner is applied to the primary transfer roller 206 by a high-voltage power supply (not shown). Therefore, an electric field is formed at a nip portion formed between the primary transfer roller 206 and the photosensitive drum 301, and the toner image is transferred from the photosensitive drum 301 onto the intermediate transfer belt 205. The intermediate transfer belt 205 is stretched around an opposing roller 217 as well, and a density sensor 218, which serves as a detection unit, is provided on a side opposite to the opposing roller 217 across the intermediate transfer belt 205.

The toner remaining on the surface of the photosensitive drum 301 that cannot be completely transferred onto the intermediate transfer belt 205 is removed from the photosensitive drum 301 by a drum cleaning blade 304 to be collected in a waste toner container 305. A toner replenishing roller 306 is rotated in an arrow-D direction illustrated in FIG. 2A to replenish the developing roller 303 with the toner, and a stirrer 307 is rotated in an arrow-E direction illustrated in FIG. 2A to replenish the toner replenishing roller 306 with the toner. A toner regulating blade 308 is fixed, and hence the developing roller 303 is rubbed by the toner regulating blade 308 due to its own rotation. The toner coating the surface of the developing roller 303 has the amount regulated while being charged at this rubbing portion. As a result, the toner image can be developed with a stable density. A configuration including the developing roller 303, the stirrer 307, the toner replenishing roller 306, and the toner regulating blade 308 is hereinafter referred to collectively as "developing unit 309". Meanwhile, a configuration including the photosensitive drum 301, the charging roller 302, the drum cleaning blade 304, and the waste toner container 305 is hereinafter referred to collectively as "drum unit 310".

The image forming apparatus 200 according to the first embodiment can not only use the normal print mode as a reference image formation mode but also use the wide color gamut print mode as a variable density image formation mode. In the wide color gamut print mode, a difference of the circumferential speed (hereinafter referred to as "circumferential speed difference") of the developing roller 303 from the circumferential speed of the photosensitive drum 301 is set larger than in the normal print mode, or the potential contrast is increased so that a developer amount per unit area on the photosensitive drum 301 (on a photosensitive drum) is increased to achieve a wider color gamut. In the following, the developer amount is also referred to as "toner amount". That is, in the wide color gamut print mode, the circumferential speed difference is increased so that the supply amount of toner becomes larger than in the normal print mode. This requires the setting of the surface potential of the photosensitive drum 301, and setting of the potential contrast is described later in detail.

The intermediate transfer belt 205 is rotated in the rotation direction A, to thereby cause toner images generated in the image forming stations S for the respective colors to be formed on the intermediate transfer belt 205 (on the belt) and carried. The recording materials 203 are received to be stacked in a sheet feeding cassette 208. Sheet feeding rollers 209 are driven based on a sheet feeding start signal, to thereby feed each of the recording materials 203. The recording material 203 is conveyed so as to reach, via a registration roller pair 210, the nip portion (hereinafter also referred to as "secondary transfer portion") formed between a secondary transfer roller 211 and a secondary transfer opposing roller 212 at a predetermined timing.

Specifically, the recording material 203 is conveyed so that the leading edge portion of the toner image on the intermediate transfer belt 205 and the leading edge portion of the recording material 203 meet each other at a predetermined timing. While the recording material 203 is nipped and conveyed between the secondary transfer roller 211 and the secondary transfer opposing roller 212, a voltage having a polarity reverse to that of the toner is applied to the secondary transfer roller 211 from a power supply apparatus (not shown). The secondary transfer opposing roller 212 is grounded, and hence an electric field is formed between the secondary transfer roller 211 and the secondary transfer opposing roller 212. This electric field causes the toner image to be transferred from the intermediate transfer belt 205 onto the recording material 203. After passing through the nip portion between the secondary transfer roller 211 and the secondary transfer opposing roller 212, the recording material 203 is subjected to heating and pressurizing processing by a fixing device 213. This causes the toner image on the recording material 203 to be fixed to the recording material 203. After that, the recording material 203 is conveyed from an outlet 214 to a delivery tray 215, and thus the process of image formation is completed. Meanwhile, the toner on the intermediate transfer belt 205 that cannot be completely transferred by the secondary transfer portion is removed from the intermediate transfer belt 205 by a cleaning member 216, and the intermediate transfer belt 205 is refreshed to a state that allows the image formation again.

The image forming apparatus 200 includes an operating unit 300. The operating unit 300 includes a numeric keypad or a touch panel. On the operating unit 300, information relating to printing is received as input from a user, and information indicating a state of the image forming apparatus 200 is displayed.

[Photosensitive Drum]

Figure 2B:
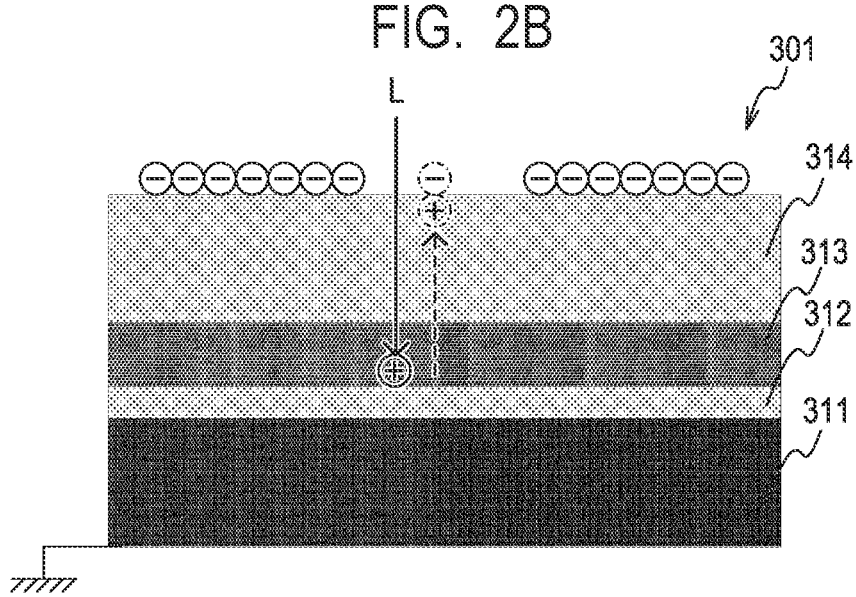
FIG. 2B is a schematic explanatory diagram of a layer structure of a photosensitive drum.

FIG. 2B is a diagram for illustrating a layer structure of the photosensitive drum 301. The photosensitive drum 301 is structured of layers in order from the bottom layer as follows. The photosensitive drum 301 is formed of a drum base 311 made of aluminum or other such conductive material, an undercoat layer 312 for suppressing the interference of light and improving the adhesive property of an upper layer, a charge generating layer 313 for generating a carrier, and a charge transporting layer 314 for transporting the generated carrier. The drum base 311 is grounded, and the surface of the photosensitive drum 301 is charged by the charging roller 302 so that an electric field directed from the inside of the photosensitive drum 301 toward the outside is formed. When the photosensitive drum 301 is irradiated with laser light L by the scanner unit 207, a carrier (circle with a plus sign) is generated by the charge generating layer 313. This carrier is moved by the above-mentioned electric field (broken line) to be paired with a charge (circle with a minus sign) on the surface of the photosensitive drum 301, to thereby change the surface potential of the photosensitive drum 301.

[Surface Potential of Photosensitive Drum or the Like]

The surface potential of the photosensitive drum 301 in the normal print mode and the wide color gamut print mode is described with reference to FIG. 3. In FIG. 3, the vertical axis represents a potential (–V). First, the potential to which the surface of the photosensitive drum 301 is charged by the charging roller 302 is set as a charging potential Vd. After that, the surface potential of the photosensitive drum 301, which has been exposed to light, is changed to an exposure potential Vl. A voltage is applied to the developing roller 303 by a high-voltage power supply (not shown) so as to maintain a developing potential Vdc. The developing potential Vdc is set between the exposure potential Vl and the charging potential Vd. Therefore, in a non-exposure section, an electric field is formed in a direction reverse to a direction in which the toner coating the surface of the developing roller 303 is developed toward the photosensitive drum 301 side, while in an exposure section, an electric field is formed in the direction in which the toner is developed toward the photosensitive drum 301 side. The toner is developed in the exposure section based on the electric field, but the surface potential of the photosensitive drum 301 increases due to a toner charge as more toner is developed, and hence the electric field becomes weaker in the exposure section. Therefore, even when the circumferential speed difference is increased with the aim of increasing a toner supply amount, the toner amount on the photosensitive drum 301 is saturated with a certain circumferential speed difference. In order to increase the toner amount on the photosensitive drum 301, it is required to set a sufficient potential contrast (Vdc-Vl). In this case, the potential contrast of Vdc-Vl is set as a potential contrast Vcont. However, even when the exposure amount is increased under a state in which the charges based on the charging voltage have sufficiently disappeared due to the exposure, the electric field inside the photosensitive drum 301 has become weaker, and hence the carrier generated in the charge generating layer 313 is not moved to the surface, which inhibits the potential from being changed. Therefore, in order to set a higher potential contrast Vcont, a higher charging voltage is required.

As described above, in the normal print mode for a construction of the first embodiment, a circumferential speed difference of 140%, Vd_n=–500 V, Vdc_n=–350 V, and Vl_n=–100 V are employed. Meanwhile, in the wide color gamut print mode, the circumferential speed difference of 280%, Vd_w=–850 V, Vdc_w=–600 V, and Vl_w=–120 V are employed. In this case, the charging voltage Vd, the developing potential Vdc, and the exposure potential Vl are represented by Vd_n, Vdc_n, and Vl_n, respectively, in the normal print mode, and represented by Vd_w, Vdc_w, and Vl_w, respectively, in the wide color gamut print mode. Each of the potentials in each print mode is set to a sufficient value required for developing the toner coating the surface of the developing roller 303. Therefore, even when the potential fluctuates for some reason, the toner amount to be developed does not change, which stabilizes the density. However, assuming that each of the potentials in the wide color gamut print mode is employed in the normal print mode, when the potential fluctuates, the toner amount to be developed changes in accordance with the fluctuation, which impairs the stability of the density. As described above, in the first embodiment, Vd_n, Vdc_n, and Vl_n are employed, instead of Vd_w, Vdc_w, and Vl_w, as the respective potentials in the normal print mode from the viewpoint of the stability of the density.

[Density Sensor]

Figure 4A:
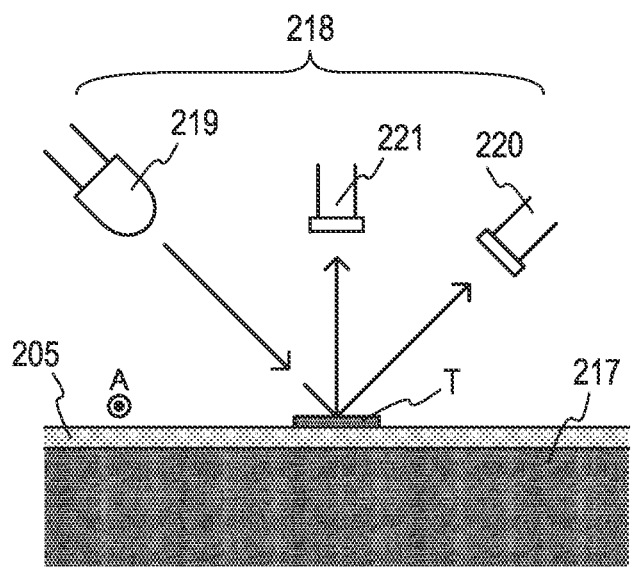
FIG. 4A is a schematic explanatory diagram of a configuration of a density sensor in each of the first embodiment and the second embodiment to be disclosed.

In an electrophotographic image forming apparatus, the hue of printed matter varies depending on various conditions including the use state of the cartridge and the use environment. Therefore, it is required to measure the density as appropriate and feed back the density to a control mechanism inside an image forming apparatus main body. FIG. 4A is a diagram for illustrating a schematic configuration of the density sensor 218 serving as a density measuring unit. After having been transferred onto the surface of the intermediate transfer belt 205 in the image forming station S, a toner image T is carried to the position of the opposing roller 217 in accordance with the rotation of the intermediate transfer belt 205. The density sensor 218 is arranged on a side opposite to the opposing roller 217 across the intermediate transfer belt 205. The density sensor 218 mainly includes a light emitting element 219, a specularly-reflected-light receiving element 220, and a diffusely-reflected-light receiving element 221. The light emitting element 219 emits infrared light, and the infrared light is reflected by the surface of the toner image T. The specularly-reflected-light receiving element 220 is arranged in a specular reflection direction with respect to the position of the toner image T, and detects light specularly reflected at the position of the toner image T. The diffusely-reflected-light receiving element 221 is arranged at a position other than a position in the specular reflection direction with respect to the toner image T, and detects light diffusely reflected at the position of the toner image T. The rotation direction A in FIG. 4A is the same as the above-mentioned rotation direction A of the intermediate transfer belt 205, and in FIG. 4A, the intermediate transfer belt 205 is moved from the back of the drawing sheet toward the front.

[Sensor Output]

Figure 4B:
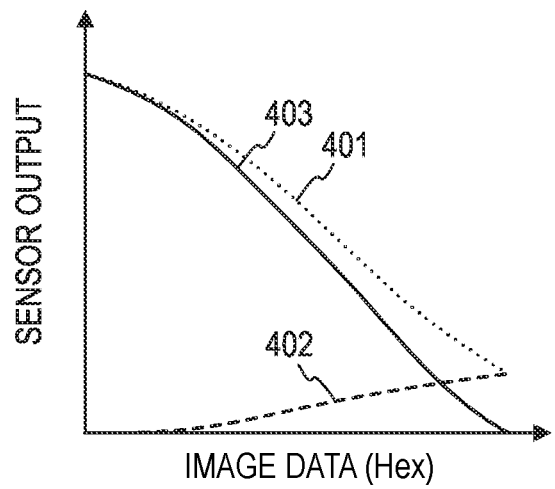
FIG. 4B and FIG. 4C are each a schematic explanatory graph of a density sensor output.

FIG. 4B is a graph for showing output results obtained by the density sensor 218. In FIG. 4B, the horizontal axis represents image data, which is expressed in hexadecimal (Hex), and the vertical axis represents an output (sensor output) from the density sensor 218. When the toner image T has a small toner amount, that is, when the image data has a small value, the density sensor 218 detects the reflection from the surface of the intermediate transfer belt 205, which is smooth, mirror finished, and black, and hence a specular reflection detecting output 401 (dotted line) is large, while a diffuse reflection detecting output 402 (broken line) is small. The particle diameter of the toner is larger than the scale of the surface properties of the intermediate transfer belt 205. Therefore, when the toner is increased, that is, when the image data has a larger value, the specular reflection detecting output 401 becomes smaller, while the diffuse reflection detecting output 402 becomes larger. The specular reflection detecting output 401 includes a diffuse reflection component, and hence it is possible to obtain a sensor output 403 (solid line) correlated with the density by subtracting the diffuse reflection component from the specular reflection detecting output 401 based on the diffuse reflection detecting output 402. As described above, the density is calculated based on the detection results of the specularly reflected light and the diffusely reflected light, which are obtained by the density sensor 218.

[Diffused Reflection Detection Output]

Through use of the sensor output described above, it is possible to measure a detection image in the wide color gamut print mode. However, when a toner amount of the detection image (detection image having a large gradation value) increases, accuracy of the above-mentioned sensor deteriorates. Now, a mechanism for improving the accuracy by correcting the diffused reflection detection output 402 with the specular reflection detection output (after diffuse reflection output is subtracted) 403 is described. Details thereof are described in, for example, Japanese Patent Application Laid-Open No. 2002-236402.

Figure 4C:
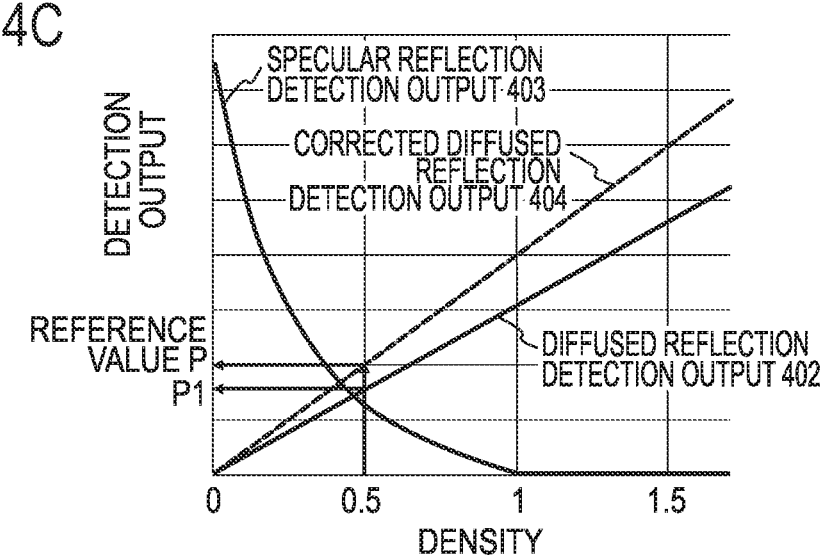

FIG. 4C is a graph for showing the specular reflection detection output (after diffuse reflection output is subtracted) 403 and the diffused reflection detection output 402, which are exhibited when the toner image T on the surface of the intermediate transfer belt 205 is detected by the density sensor 218. The horizontal axis represents a density, and the vertical axis represents a detection output. In this case, the detection output obtained when a yellow toner is detected by the density sensor 218 is described as an example. The specular reflection detection output 403 is detected by the density sensor 218 at a predetermined timing. The diffused reflection detection output 402 is detected by the density sensor 218 at the same predetermined timing as that of the specular reflection detection output 403. The specular reflection detection output 403 has the highest detection output when detecting the surface of the intermediate transfer belt 205 (namely, when the density is 0). Meanwhile, the specular reflection detection output 403 has the detection output reaching to stay at a lower limit of 0 around a position at which the density becomes 1. It is understood therefrom that the specular reflection detection output 403 exhibits high detection accuracy on the low density side, while exhibiting low detection accuracy on the high density side.

The diffused reflection detection output 402 rises as the density increases. It is understood that the detection accuracy is inferior due to a smaller change in value than in the case of the specular reflection detection output 403 on the low density side, but satisfactory detection accuracy is exhibited on the high density side. In view of this, density detection is performed on the high density side with normalized diffused reflection detection output, to thereby be able to improve accuracy of density detection.

Now, a normalization correction procedure for the diffused reflection detection output using the specular reflection detection output is described with reference to FIG. 4C. First, the specular reflection detection output 403 normalized by a base output value is uniquely determined, and hence in the first embodiment, the detection output at a density of 0.5 is set as a reference value P. In FIG. 4C, the diffused reflection detection output 402 that has not been normalized is set as P1 at the density of 0.5.

Therefore, the diffused reflection detection output 402 that has not been normalized is multiplied by the value of P/P1 to obtain diffused reflection detection output 404 that has been normalized. Then, the controller 201 detects and acquires the diffused reflection detection output 404 through the detection of the detection image having a gradation equal to or higher than a predetermined density (equal to or higher than a density of, for example, 0.5).

The diffused reflection detection output 404 that has been normalized can be obtained by the above-mentioned procedure, to thereby allow more accurate density detection to be performed even in a high density region (exhibiting a density equal to or higher than, for example, 0.5).

[Image Processing]

Figure 5:
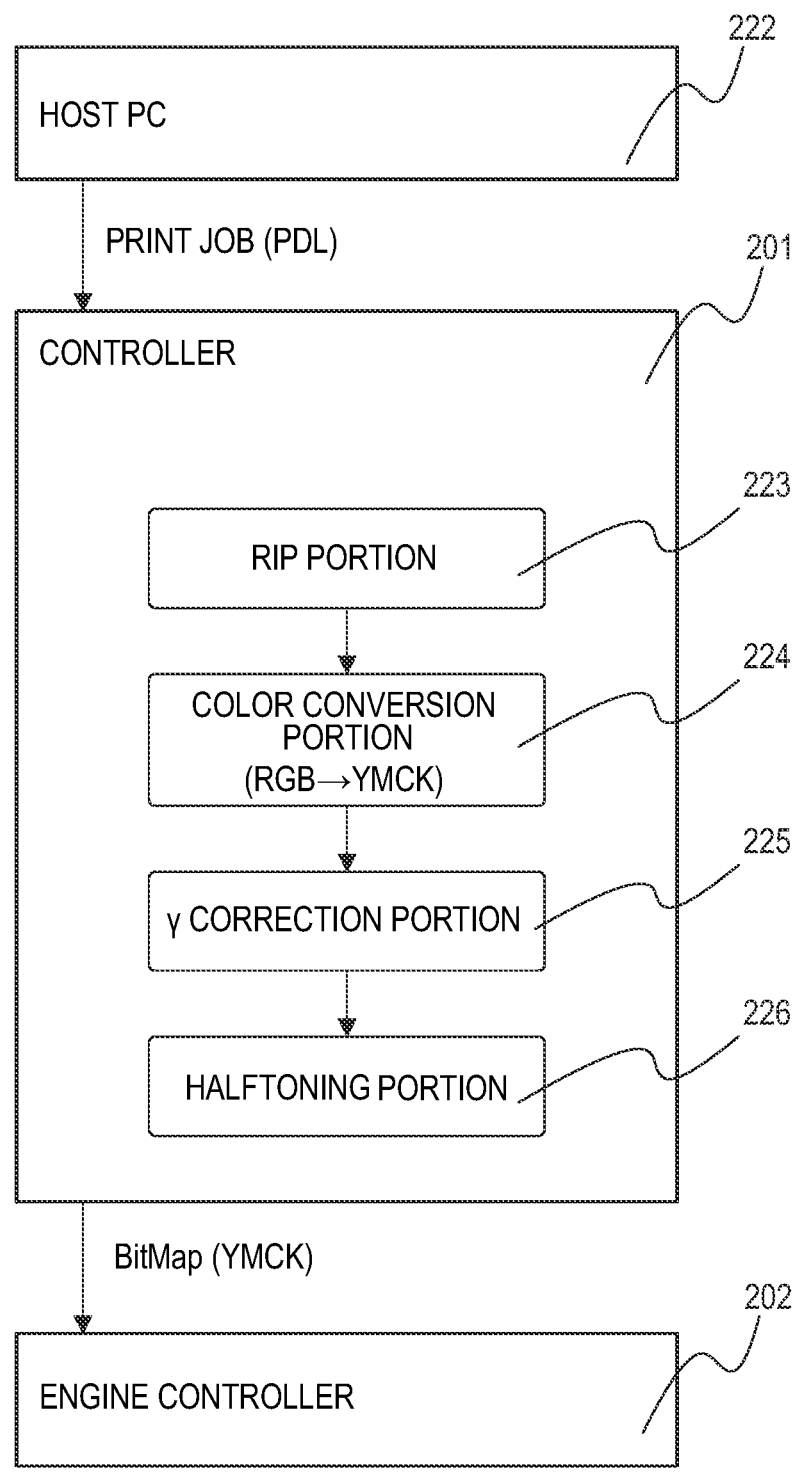
FIG. 5 is a schematic explanatory diagram of controller processing in each of the first embodiment and the second embodiment to be disclosed.

Next, it is described how hue information obtained by the density sensor 218 is used for correction. In FIG. 5, an outline of a flow of processing of the controller is illustrated. In general, a print job described in PCL, PostScript, or other such page description language (PDL) is transmitted from the host PC 222 or the like to the controller 201. The controller 201 transmits bitmap information on Y, M, C, and K to the engine controller 202 mainly via a raster image processor (RIP) portion 223, a color conversion portion 224, a γ correction portion 225, and a halftoning portion 226.

Specifically, the RIP portion 223 subjects the print job described in PDL, which has been transmitted from the host PC 222, to a file analysis by an interpreter, and performs conversion into an RGB bitmap corresponding to the resolution of the image forming apparatus 200. In general, a color reproduction range of the electrophotographic image forming apparatus is narrower than a color reproduction range of a liquid crystal display. Therefore, the color conversion portion 224 in the subsequent stage performs color matching so as to match the hue as much as possible in consideration of a difference in color reproduction range between devices. The color conversion portion 224 also performs, for example, conversion from RGB data into YMCK data. After that, the γ correction portion 225 performs gamma correction, and the halftoning portion 226 performs dithering or other such gradation expression processing. The detection results obtained by the density sensor 218 are used for selecting appropriate image data by the γ correction portion 225.

[Lookup Table]

In FIG. 6A, a lookup table (LUT) is shown. In the first quadrant of FIG. 6A, a graph of a lookup table is shown, and the horizontal axis represents input image data, which is expressed in hexadecimal (Hex), while the vertical axis represents image data to be used, which is expressed in hexadecimal. In the second quadrant of FIG. 6A, a γ curve before correction (hereinafter also referred to as "before-correction γ-curve") is shown, and the horizontal axis represents a reflection density, while the vertical axis represents the image data to be used in the same manner as in the first quadrant. The reflection density is also referred to as simply as "density". The γ curve refers to a curved line indicating a relationship between input image data (i) and an actual output image density corresponding to the input image data. In the third quadrant, a γ curve after correction (hereinafter also referred to as "after-correction γ curve") is shown, and the horizontal axis represents the reflection density (density output) in the same manner as in the second quadrant, while the vertical axis represents the input image data (Hex). The graph shown in the second quadrant of FIG. 6A is the before-correction γ-curve. Normally, the before-correction γ-curve has no linearity. Therefore, the input image data is not used as it is, and such image data as to maintain linearity is selected to be used. A table indicating a correlation between this input image data and the image data to be actually used is referred to as "lookup table". In addition, processing for recreating the lookup table based on the characteristic of the current image forming apparatus main body is referred to as "gamma correction" (hereinafter referred to as "γ correction"). It is assumed to be ideal that, as shown in the third quadrant of FIG. 6A, there is linearity in a relationship between the input image data and the reflection density. This graph is a graph for showing a general relationship between the input image data and the reflection density and the like. The data of this graph is, for example, data obtained based on a result of measuring the density of an image after fixation, which has been printed on the recording material 203, by an external measuring apparatus or the like. For example, it is understood in this example that it is actually required to use the image data of C0h in order to obtain an ideal density for the input image data of 80h in consideration of the characteristic (before-correction γ-curve) of the current image forming apparatus main body shown in the second quadrant of FIG. 6A.

The before-correction γ-curve is the characteristic of the current image forming apparatus itself, and varies depending on various conditions including the cartridge and the use environment. The same applies to a difference between print modes, for example, the normal print mode and the wide color gamut print mode. A graph of FIG. 6B is plotted in the same manner as in the graph of FIG. 6A, and descriptions of the horizontal axis, the vertical axis, and the like are omitted. FIG. 6B is a graph for showing how the reflection density deviates from the linearity when printing is performed in the wide color gamut print mode through use of the lookup table (first conversion unit) optimized for the normal print mode. In FIG. 6B, the broken line in the second quadrant indicates the characteristic of the image forming apparatus main body in the normal print mode, and the graph of the broken line is the same as the graph of the second quadrant of FIG. 6A. Meanwhile, in FIG. 6B, the solid line in the second quadrant indicates the characteristic (before-correction γ-curve) of the image forming apparatus main body in the wide color gamut print mode. The wide color gamut print mode is a print mode of increasing the toner amount by increasing the circumferential speed difference of the developing roller 303 from the photosensitive drum 301. Therefore, in the wide color gamut print mode, the reflection density is higher than in the normal print mode over the entire image data area. When the image formation is performed based on the input image data of 80h, the reflection density is about 0.6 in the normal print mode, while the reflection density increases to 1.0 in the wide color gamut print mode. That is, when the LUT in the normal print mode is used for the input image data of 80h, the image data to be used becomes C0h. For this reason, the density in the wide color gamut print mode becomes 1.0, which is darker than 0.6 being the density to be achieved.

As a result, as shown in the third quadrant of FIG. 6B, the after-correction γ-curve (broken line) in the normal print mode has linearity, while the after-correction γ-curve (solid line) in the wide color gamut print mode does not have linearity, and has a lopsided shape. Therefore, it is normally required to obtain a lookup table in the wide color gamut print mode after grasping the gamma through use of the density sensor 218 also in the wide color gamut print mode in the same manner as in the normal print mode. However, in order to obtain the LUT for the wide color gamut print mode, it is required to add the step of forming a toner image (detection image) for detection on the intermediate transfer belt 205 and measuring the density of the toner image for detection by the density sensor 218 also in the wide color gamut print mode separately from the normal print mode. This causes downtime for obtaining a LUT in the wide color gamut print mode.

[Regarding Predicted Density Correction]

In the first embodiment, detection image actual measurement that causes downtime with satisfactory accuracy is combined with predicted density correction that causes no downtime with accuracy lower than that of the detection image actual measurement. With this combination, the frequency of performing the detection image actual measurement can be suppressed while a stable color impression is reproduced. The predicted density correction in the first embodiment is described. In the predicted density correction, the γ correction is performed by creating a look-up table in the wide color gamut print mode based on predetermined information and density information in the normal print mode. The predetermined information includes, for example, a circumferential speed difference of the developing roller 303 from a photosensitive drum 301 and information relating to the use of the cartridge. Now, parameters (predetermined information described above) required when the density information in the wide color gamut print mode is calculated from the density information in the normal print mode are described.

[Circumferential Speed Difference of Developing Roller 303]

Figure 7A:
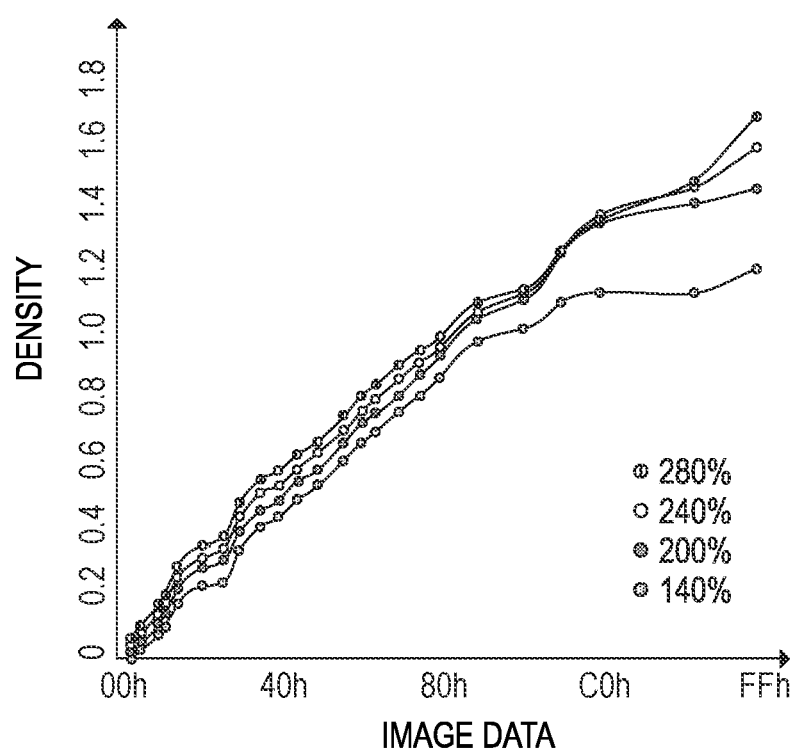
FIG. 7A and FIG. 7B are each a schematic explanatory graph of densities based on a circumferential speed of a developing roller and a degree of use of the photosensitive drum in the first embodiment to be disclosed.

FIG. 7A is a graph for showing a density exhibited when the circumferential speed difference is changed under potential settings in the wide color gamut print mode, namely, Vd_w=−850 V, Vdc_w=−600 V, and Vl_w=−120 V. In FIG. 7A, the horizontal axis represents the image data, and the vertical axis represents the density (OD). The data is obtained when the circumferential speed difference is 140%, 200%, 240%, and 280%. It is understood that, in any gradation (image data), the density becomes higher as the circumferential speed difference becomes larger. As has been described so far, this is because the toner amount supplied to the photosensitive drum 301 is increased by increasing the circumferential speed difference. Therefore, in order to calculate the density information in the wide color gamut print mode from the density information in the normal print mode, it is required to include the circumferential speed difference as one of the parameters.

[Degree of Use of Photosensitive Drum 301]

Figure 7B:
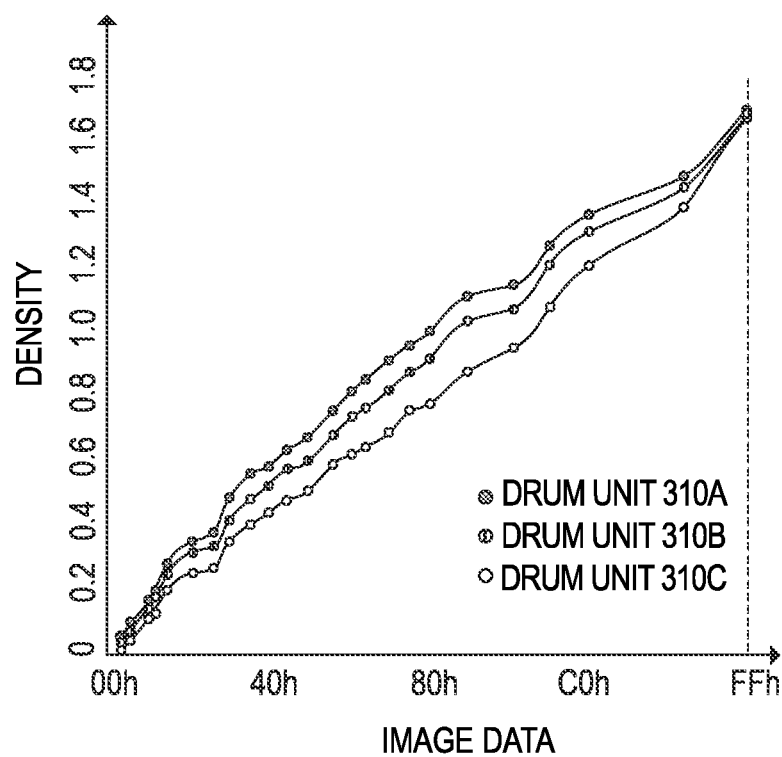

FIG. 7B is a graph for showing differences in density in the wide color gamut print mode among drum units exhibiting different degrees of use. The horizontal axis and the vertical axis of FIG. 7B are the same as those of FIG. 7A, and descriptions thereof are omitted. A drum unit 310A is in a new condition, a drum unit 310B has printed 20,000 recording materials 203, and a drum unit 310C has printed 50,000 recording materials 203. As the number of printed recording materials 203 becomes larger, that is, as the use of the photosensitive drum 301 progresses, the density becomes lower (lighter) over the entire image data area. This is because the sensitivity of the photosensitive drum 301 to a light amount of light emitted by the scanner unit 207 is changed due to the use.

Figure 8A:
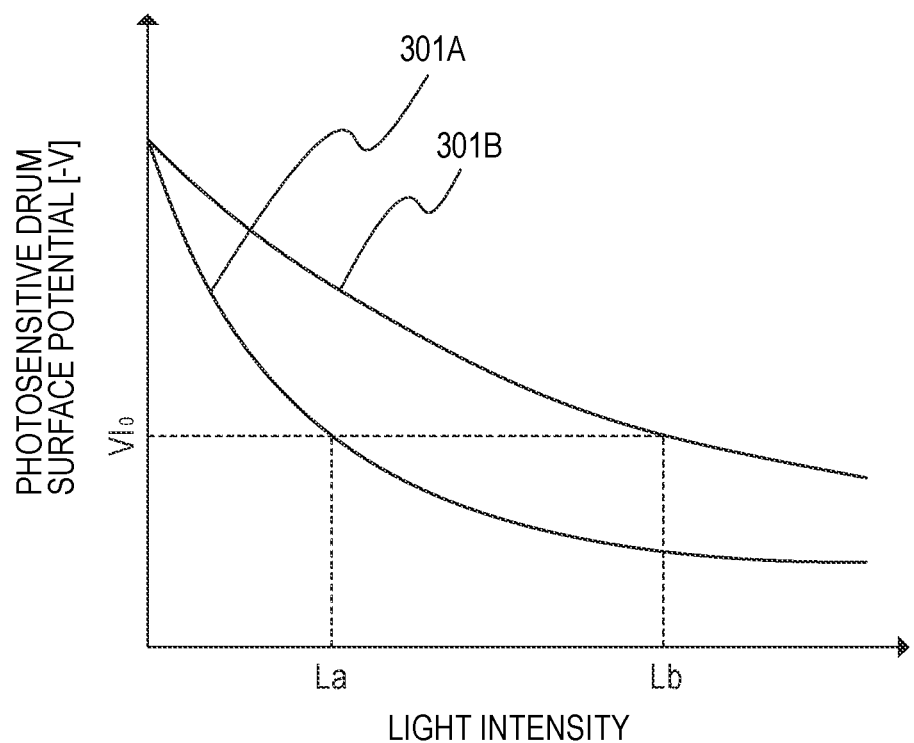
FIG. 8A is a schematic explanatory graph of the surface potential with respect to a light intensity based on the degree of use of the photosensitive drum in the first embodiment to be disclosed.

FIG. 8A is a graph for showing a concept of the characteristics of the light amount of the light emitted by the scanner unit 207 and the surface potential of the photosensitive drum 301. In FIG. 8A, the horizontal axis represents the light amount of the light emitted by the scanner unit 207, and the vertical axis represents the surface potential (−V) of the photosensitive drum 301. In FIG. 8A, a new photosensitive drum 301A and an (old) photosensitive drum 301B exhibiting a large degree of use are shown. The photosensitive drum 301 becomes thinner in thickness as the charge transporting layer 314 being the outermost layer of the photosensitive drum 301 is scraped more due to the use. A capacitance increases as the photosensitive drum 301 becomes thinner in thickness, and hence the sensitivity for the surface potential to an amount of charge by which the surface is charged becomes lower. Therefore, when exposure is to be performed to lower the potential to an exposure potential Vl0, which is the same as that of the new photosensitive drum 301A, a light amount La is sufficient for the new photosensitive drum 301A, but the old photosensitive drum 301B requires a larger light amount Lb (Lb>La). This means that, in order to achieve the same density as the density achieved by the new photosensitive drum 301A, the old photosensitive drum 301B requires the image data having a higher density.

As described above, it is understood that the density depends on the number of printed recording materials 203 that have been printed by the drum unit 310. As understood from the data shown in FIG. 7B, the drum unit 310B is plotted substantially in the middle between the drum unit 310A and the drum unit 310C, and hence there is considered to be a linear correlation between a change in density due to the printing performed on the recording material 203 and the number of printed recording materials 203.

[Degree of Use of Developing Unit 309]

Figure 8B:
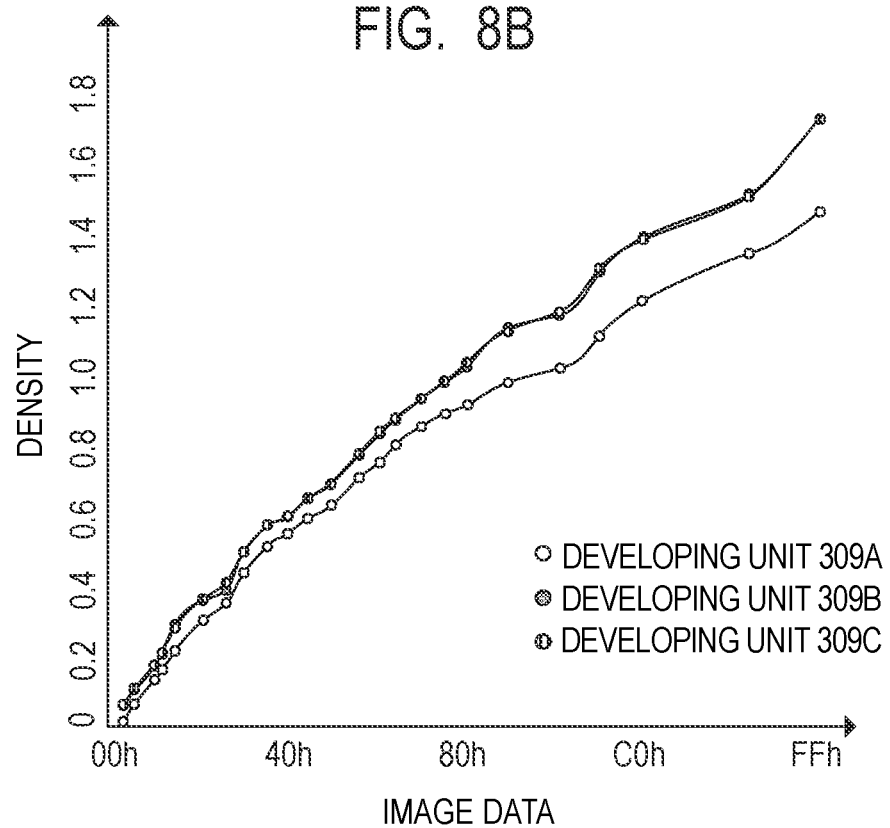
FIG. 8B is a schematic explanatory graph of densities based on a degree of use of a developing unit.

FIG. 8B is a graph for showing densities used by the developing units 309 exhibiting different degrees of use in the wide color gamut print mode. The horizontal axis and the vertical axis of FIG. 8B are the same as those of FIG. 7A and FIG. 7B, and descriptions thereof are omitted. A new developing unit 309A exhibits a lower density over the entire image data area than a developing unit 309B subjected to the printing of 3,000 recording materials 203 at a coverage rate of 5%. This is ascribable to the fact that toner having a small particle diameter is relatively easily consumed at the beginning and is easily charged due to rubbing with the toner regulating blade 308. As described above, as more toner is developed, a potential difference from Vdc decreases due to the charge of the toner itself. This phenomenon is expressed as the potential contrast Vcont (=Vdc−Vl) being gradually filled. As the potential contrast Vcont is gradually filled with more toner charges, development is gradually performed less often. In higher charging, a larger part of the potential contrast Vcont is gradually filled, with the result that the density is lowered. The term "high charging" mentioned above refers to being large in the minus direction, and the charging becomes higher at a higher position on the vertical axis of the graph of FIG. 3. Meanwhile, a developing unit 309C subjected to the printing of 30,000 recording materials 203 at the same coverage rate of 5% as that of the developing unit 309B exhibits a density substantially the same as that of the developing unit 309B. This is considered to be because, with the construction of the first embodiment, most of the toner having a small particle diameter has been consumed at a timing at which about 3,000 recording materials 203 have been printed.

As described above, it is understood that the density depends on a toner use amount. The toner use amount of toner used when 3,000 recording materials 203 are printed at the coverage rate of 5% is a minute amount compared to the whole toner amount. For this reason, it is assumed that, in the first embodiment, the density linearly changes until the toner use amount equivalent to the amount of toner used when 3,000 recording materials 203 are printed at the coverage rate of 5%, and after that, the density maintains a constant level without changing.

It is understood from FIG. 7A, FIG. 7B, and FIG. 8B that the circumferential speed difference of the developing roller 303, the degree of use of the drum unit 310, the consumption degree of the toner, and other such factors influence a relationship between the density information in the normal print mode and the density information in the wide color gamut print mode. Therefore, a correlation table between the density information in the normal print mode and the density information in the wide color gamut print mode under each condition (predetermined condition) is provided in advance so that hue adjustment can be performed without measuring the density in the wide color gamut print mode in addition to the normal print mode.

[Creation of Correlation Table]

Figure 9:
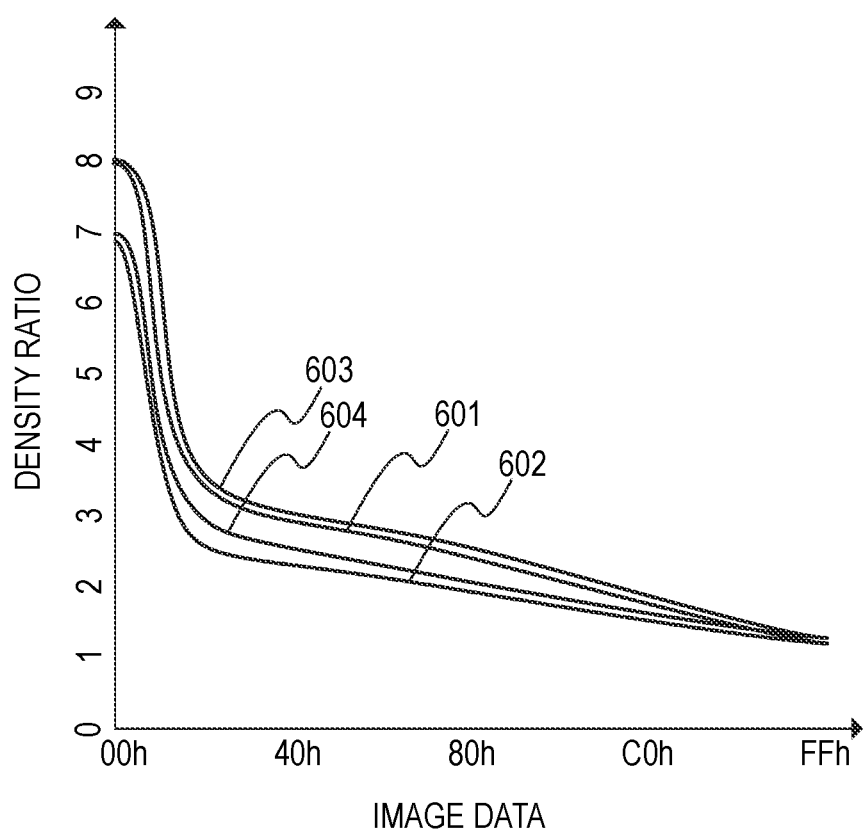
FIG. 9 is a schematic explanatory graph of density ratios between the normal print mode and the wide color gamut print mode in the first embodiment to be disclosed.

Now, how the correlation table is created and how the correlation table is applied are specifically described. Data required for creating the correlation table includes pieces of density data on the recording material 203 obtained in the normal print mode and the wide color gamut print mode for the respective circumferential speed differences in the case of using a new drum unit 310, a life-equivalent drum unit 310 exhibiting a large degree of use, a new developing unit 309, and a developing unit 309 subjected to the printing of about 3,000 recording materials 203 at the coverage rate of 5%. Those pieces of density data are based on data obtained by measuring the density of the image after the fixation, which has been formed on the recording material 203, by the external measuring apparatus or the like during, for example, a development process for the image forming apparatus. In order to obtain a desired density in the image finally formed on the recording material 203, the density of the image after the fixation, which has been formed on the recording material 203, is measured by the external measuring apparatus or the like. It is therefore assumed that a table indicating a correlation between the data obtained by measuring the density of the image after the fixation and data obtained by measuring the density of an image before the fixation by the density sensor 218 is stored in advance in, for example, a storage portion (not shown) included in the controller 201. As described above, the circumferential speed difference is 280% in the wide color gamut print mode. FIG. 9 is a graph for showing a correlation table for calculating the density at the circumferential speed difference of 280% based on the density information at the circumferential speed difference of 140% in the normal print mode. In FIG. 9, the horizontal axis represents the image data (gradation), and the vertical axis represents a density ratio.

The correlation table refers to a density ratio between the two print modes, and is defined as a quotient obtained by dividing the density in the wide color gamut print mode by the density in the normal print mode. On a low density side (or a low gradation side or a side on which the image data has a small value), the density in the normal print mode is low, and hence the density ratio tends to be high, and tends to become smaller as the density increases. In addition, the new drum unit 310A has a density ratio higher than that of the drum unit 310C using the photosensitive drum 301 subjected to the printing of 50,000 recording materials 203. This is ascribable to the fact that the drum units 310A and 310C exhibit a larger difference between the densities in the wide color gamut print mode than a difference between the densities in the normal print mode. The difference between the densities in the wide color gamut print mode is as described with reference to FIG. 7B.

When the density in the wide color gamut print mode is to be calculated, first, the current toner use amount is calculated based on the data stored in a nonvolatile memory 234 mounted to the process cartridge 204. As described above, the density linearly changes until the toner use amount (predetermined use amount) equivalent to the amount of toner used when 3,000 recording materials 203 are printed at the coverage rate of 5%, and after that, the density maintains a constant level. Therefore, the following item (1) is calculated from a correlation table 601 (first density ratio) for the drum unit 310A and the developing unit 309A and a correlation table 603 (second density ratio) for the drum unit 310A and the developing unit 309B. That is, (1) a correlation table for the drum unit 310A and the current developing unit 309 is calculated. The toner use amount is used for the calculation of the correlation table of the item (1).

Specifically, when the current developing unit 309 has consumed the toner having an amount equivalent to the amount of toner used when 3,000 or more recording materials 203 are printed at the coverage rate of 5%, the correlation table for this case is the same as the correlation table 603. Meanwhile, when the current developing unit has printed only less than 3,000 recording materials 203 at the coverage rate of 5%, the correlation table for this case falls in the middle between the correlation table 601 and the correlation table 603, and the correlation table is calculated on the assumption that the change takes place linearly based on the toner use amount.

In the same manner, the following item (2) is calculated from a correlation table 602 (third density ratio) for the drum unit 310C and the developing unit 309A and a correlation table 604 (fourth density ratio) for the drum unit 310C and the developing unit 309B. That is, (2) a correlation table for the drum unit 310C and the current developing unit 309 is calculated. Subsequently, the use amount of the current drum unit 310 is calculated based on the data stored in the nonvolatile memory 234 mounted to the process cartridge 204. Then, the correlation table for the current drum unit 310 and the current developing unit is calculated from the two correlation tables of (1) the correlation table for the drum unit 310A and the current developing unit 309 and (2) the correlation table for the drum unit 310C and the current developing unit 309. The use amount of the drum unit 310 is used for the calculation of the correlation table of the item (2).

The influence of the use amount of the drum unit 310 on the density is calculated on the assumption that the change takes place linearly based on the use amount as described above. That is, the correlation table for the drum unit 310 subjected to the printing of, for example, 25,000 recording materials 203 falls right in the middle between the correlation table for the drum unit 310A and the current developing unit and the correlation table for the drum unit 310C and the current developing unit.

As described above, the image forming apparatus according to the first embodiment uses the correlation table based on the density information (detection results obtained by the density sensor 218) in the normal print mode and the circumferential speed difference of the developing roller 303 or other such parameter. With this configuration, the lookup table in the wide color gamut print mode can be obtained without downtime. In the first embodiment, the look-up table in the wide color gamut print mode is obtained in the above-mentioned manner, and the predicted density correction is performed by performing the γ correction. Examples of parameters to be required other than the circumferential speed difference include the degree of use of the photosensitive drum 301 and the consumption degree of the toner. In the construction of the first embodiment, the circumferential speed difference of the developing roller 303 is employed, but any parameter for controlling the toner supply amount may be employed, and the present disclosure is not limited to the configuration using the circumferential speed difference. When the density information is changed by other parameters, it is required to include those parameters as well. Specific examples thereof include the rotation time of the developing roller 303. This is based on a phenomenon that the surface of the toner regulating blade 308 wears due to the rubbing between the developing roller 303 and the toner regulating blade 308 to change the amount of the toner coating the surface of the developing roller 303 after regulation.

In the first embodiment, the lookup table in the wide color gamut print mode is predicted based on the detection results obtained by the density sensor 218 in the normal print mode. For example, the lookup table in the normal print mode may be predicted based on the detection results obtained by the density sensor 218 in the wide color gamut print mode. The first mode and the second mode are herein described as the normal print mode and the wide color gamut print mode. However, the predicted density correction can also be applied to an image forming apparatus compatible with another print mode, for example, a toner saving print mode for suppressing toner consumption. In this case, the look-up table in the toner saving print mode is predicted based on a detection result obtained by the density sensor 218 in the normal print mode. The look-up table in the normal print mode may be predicted based on a detection result obtained by the density sensor 218 in the toner saving print mode.

[Regarding Density Control in First Embodiment]

In the first embodiment, even when the toner amount is changed, predicted density correction information corrected by adding actual measurement information to predicted density correction information is used. In this case, the predicted density correction information refers to information obtained in the above-mentioned predicted density correction, specifically, a before-correction γ curve (Lγpredicted(i) described later) based on the predicted density correction in the wide color gamut print mode. The actual measurement information refers to difference information indicating a difference (ΔL(i) described later) between the before-correction γ curve based on the predicted density correction and a before-correction γ curve (Lγdetected(i) described later) based on the detection image actual measurement in the wide color gamut print mode, which is detected by the density sensor 218. With this configuration, in the first embodiment, the frequency of performing the detection image actual measurement can be suppressed while a stable color impression is reproduced. A control method in the first embodiment is described with reference to a flow chart illustrated in FIG. 10. After the description of the flow chart, effects of the first embodiment are verified.

When the image forming apparatus 200 is activated, the controller 201 starts processing of Step S2 and the subsequent steps. In Step S2, the controller 201 performs the detection image actual measurement in the normal print mode being first detection image actual measurement. Then, a before-correction γ curve Rγdetected(i) at the time of the normal print mode is obtained, and a look-up table for achieving first density output characteristics is also calculated by the controller 201. In this case, i represents input image data (for example, 40h or C0h). In Step S3, the controller 201 calculates the following value from such correlation tables as shown in FIG. 7A, FIG. 7B, and FIG. 8B based on parameters including the circumferential speed difference of the developing roller 303 exhibited when the detection image actual measurement is performed, the degree of use of the drum unit 310, and the degree of toner consumption. That is, the controller 201 calculates a correction value for the before-correction γ curve Rγdetected(i) in order to obtain the before-correction γ curve in the wide color gamut print mode based on the predicted density correction. The correction value for correcting the before-correction γ curve Rγdetected(i) based on the detection image actual measurement in the normal print mode is hereinafter expressed as ΔLpredicted(i).

When a before-correction γ curve indicating characteristics based on the predicted density correction in the wide color gamut print mode is represented by Lγpredicted(i), Lγpredicted(i) is expressed by Expression (1).

$$L\gamma predicted(i) = R\gamma detected(i) + \Delta Lpredicted(i) \quad \text{Expression (1)}$$

In this case, the correction value ΔLpredicted can be obtained from FIG. 7A, FIG. 7B, and FIG. 8B in the above-mentioned manner, and is further described with reference to FIG. 6B. As described above, in the second quadrant of FIG. 6B, the solid line indicates the before-correction γ curve in the wide color gamut print mode, and the broken line indicates the before-correction γ curve in the normal print mode, which are both obtained from the density of a fixed image. In FIG. 6B, a correction value ΔLγpredicted(i) corresponds to a difference between the two before-correction γ curves.

In Step S4, the controller 201 determines whether the difference ΔL(i) between the before-correction γ curve Lγdetected(i) based on the detection image actual measurement in the wide color gamut print mode and the before-correction γ curve Lγpredicted(i) based on the predicted density correction in the wide color gamut print mode is stored in the nonvolatile memory 230. As described above, it is highly possible that the accuracy of the detection image actual measurement using the density sensor 218 becomes higher than that of the predicted density correction in which it is difficult to correct individual differences of the image forming apparatus and the toner cartridge. It is preferred to use the stored difference ΔL(i) when the difference ΔL(i) calculated based on the before-correction γ curve Lγdetected(i) in the wide color gamut print mode based on the detection image actual measurement is stored in the nonvolatile memory 230. The before-correction γ curve Lγpredicted(i) based on the predicted density correction in the wide color gamut print mode is corrected through use of the stored difference ΔL(i), to thereby be able to correct the individual differences of the image forming apparatus and the toner cartridge with high accuracy. In addition, through use of the difference ΔL(i) stored in nonvolatile memory 230, it is also possible to reduce the frequency of performing the detection image actual measurement in the wide color gamut print mode.

The difference ΔL(i) is expressed by Expression (2). The nonvolatile memory 230 may store the difference ΔL(i), or may store the before-correction γ curve Lγdetected(i) in the wide color gamut print mode based on the detection image actual measurement.

$$\Delta L(i) = L\gamma detected(i) - L\gamma predicted(i) \quad \text{Expression (2)}$$

When determining in Step S4 the difference ΔL(i) is not stored in the nonvolatile memory 230, the controller 201 advances the processing to Step S5. In Step S5, the controller 201 performs the detection image actual measurement in the wide color gamut print mode being second detection image actual measurement. The controller 201 performs the detection image actual measurement in the wide color gamut print mode, to thereby calculate the before-correction γ curve Lγdetected(i). In Step S6, the controller 201 uses the above-mentioned Expression (2) to calculate the difference ΔL(i). Specifically, the controller 201 calculates the difference ΔL(i) from the before-correction γ curve Lγdetected(i) in the wide color gamut print mode based on the detection image actual measurement, which is calculated in Step S5, and the before-correction γ curve Lγpredicted(i) in the wide color gamut print mode based on the predicted density correction, which is calculated in Step S3. The controller 201 stores the calculated difference ΔL(i) in the nonvolatile memory 230. With this processing, the difference ΔL(i) stored in the nonvolatile memory 230 is used to correct the before-correction γ curve Lγpredicted(i) from the next time. This difference ΔL(i) corresponds to the difference information.

In Step S7, the controller 201 corrects the before-correction γ curve Lγpredicted(i) based on the predicted density correction in the wide color gamut print mode. The controller 201 uses Expression (3) to calculate the after-correction γ curve. The after-correction γ curve based on the detection result in the wide color gamut print mode is represented by Lγcorrected(i).

$$L\gamma corrected(i) = L\gamma predicted(i) + \Delta L(i) \quad \text{Expression (3)}$$

The look-up table for correcting the γ curve described in Expression (3) corresponds to a second conversion unit. In this manner, when the difference ΔL(i) is not stored in the nonvolatile memory 230, the detection image actual measurement in the wide color gamut print mode (Step S5) is performed along with the detection image actual measurement in the normal print mode (Step S2) and the predicted density correction (Step S3). For this reason, immediately after the detection image actual measurement is performed, Lγcorrected(i)=Lγdetected(i) (=Lγpredicted(i)+ΔL(i) =Lγpredicted(i)±(Lγdetected(i)−Lγpredicted(i))) is established. After that, the predicted density correction is performed, to thereby update the before-correction γ curve Lγpredicted(i) in the wide color gamut print mode, and also update Lγcorrected(i).

Meanwhile, when determining in Step S4 that the difference ΔL(i) is stored in the nonvolatile memory 230, the controller 201 advances the processing to Step S7. This occurs in a case where the detection image actual measurement in the wide color gamut print mode was performed and the difference ΔL(i) was stored in the nonvolatile memory 230 in Step S6 in the past. In this case, the controller 201 avoids performing the detection image actual measurement in the wide color gamut print mode. In Step S7, the controller 201 calculates Lγcorrected(i) (=Lγpredicted(i)+ΔL(i)) from the before-correction γ curve Lγpredicted(i) in the wide color gamut print mode based on the predicted density correction, which is calculated in Step S3, and the difference ΔL(i) stored in the nonvolatile memory 230. In Step S8, when the user performs the wide color gamut print mode, the controller 201 uses Lγcorrected(i) calculated by Expression (3) of Step S7 to recreate a look-up table (second conversion unit) (to perform the γ correction), and performs image formation in the wide color gamut print mode. A target output density to be used when the look-up table (second conversion unit) is created through use of Lγcorrected(i) by the controller 201 becomes second density output characteristics in contrast to the above-mentioned first density output characteristics.

In Step S9, the controller 201 determines whether a condition for performing the detection image actual measurement in the normal print mode (illustrated as "performing condition") has been satisfied. When determining in Step S9 that the condition for performing the detection image actual measurement in the normal print mode has not been satisfied, the controller 201 returns the processing to Step S8, and uses the result of the γ correction obtained in Step S8 to perform the image formation in the wide color gamut print mode. When determining in Step S9 that the condition for performing the detection image actual measurement in the normal print mode has been satisfied, the controller 201 returns the processing to Step S2 to perform the detection image actual measurement in the normal print mode. In this case, the condition for performing the detection image actual measurement in the normal print mode refers to a condition for a case in which there is a fear that a color impression may be changed, for example, when the image forming apparatus 200 has exceeded a predetermined number of printed sheets, when the cartridge is replaced, or when the use environment is changed.

[Verification of Effects]

Verification as to how much difference occurs in the accuracy of density control was performed between the above-mentioned case in which the density control is performed by employing the control in the first embodiment and a case in which the density control is performed by only the predicted density correction (based on control that does not involve the correction using the difference ΔLpredicted (i)). For this verification, a method of performing examination in the following order under the environment of a temperature of 23° C. and a humidity of 50% was employed.

[1] In the image forming apparatus 200, the detection image actual measurement in the normal print mode is performed to obtain the before-correction γ curve Lγpredicted(i) based on the predicted density correction in the wide color gamut print mode (Step S3 of FIG. 10).

[2] The detection image actual measurement in the wide color gamut print mode is performed to obtain the before-correction γ curve Lγdetected(i) (Step S5 of FIG. 10).

[3] The difference ΔL(i) is obtained from the before-correction γ curve Lγpredicted(i) in the wide color gamut print mode based on the predicted density correction ([1]) and the before-correction γ curve Lγdetected(i) in the wide color gamut print mode based on the detection image actual measurement ([2]) (Step S6 of FIG. 10).

[4] In order to cause a change in color impression of the image forming apparatus 200, 5,000 A4 sheets are printed with a coverage rate of 5% (change in color impression; Yes in Step S9 of FIG. 10).

[5] The detection image actual measurement in the normal print mode is again performed to obtain a before-correction γ curve Lγpredicted(5,000)(i) based on the predicted density correction in the wide color gamut print mode (Step S3 of FIG. 10). In this case, for distinction from the before-correction γ curve Lγpredicted(i) of the item [1], the before-correction γ curve obtained after the printing of 5,000 sheets is expressed as Lγpredicted(5,000)(i). In addition, Lγcorrected(5,000)(i) (=Lγpredicted(5,000)(i)+ΔL(i)) corrected through use of the difference ΔL(i) obtained in the item [3] is calculated (Yes in Step S4 and Step S7 of FIG. 10).

[6] In order to verify accuracy, the detection image actual measurement in the wide color gamut print mode is again performed to obtain a before-correction γ curve Lγdetected (5,000)(i). In this case, the before-correction γ curve obtained after the printing of 5,000 sheets is expressed as Lγdetected(5,000)(i) for distinction from the before-correction γ curve Lγdetected(i) of the item [2].

[7] It is examined which of Lγpredicted(5,000)(i) obtained in the item [5] and Lγpredicted(5,000)(i)+ΔL(i) (=Lγcorrected(5,000)(i)) corrected based on the difference ΔL(i) obtained in the item [3] is closer to the before-correction γ curve Lγdetected(5,000)(i) obtained in the item [6].

Figure 11A:
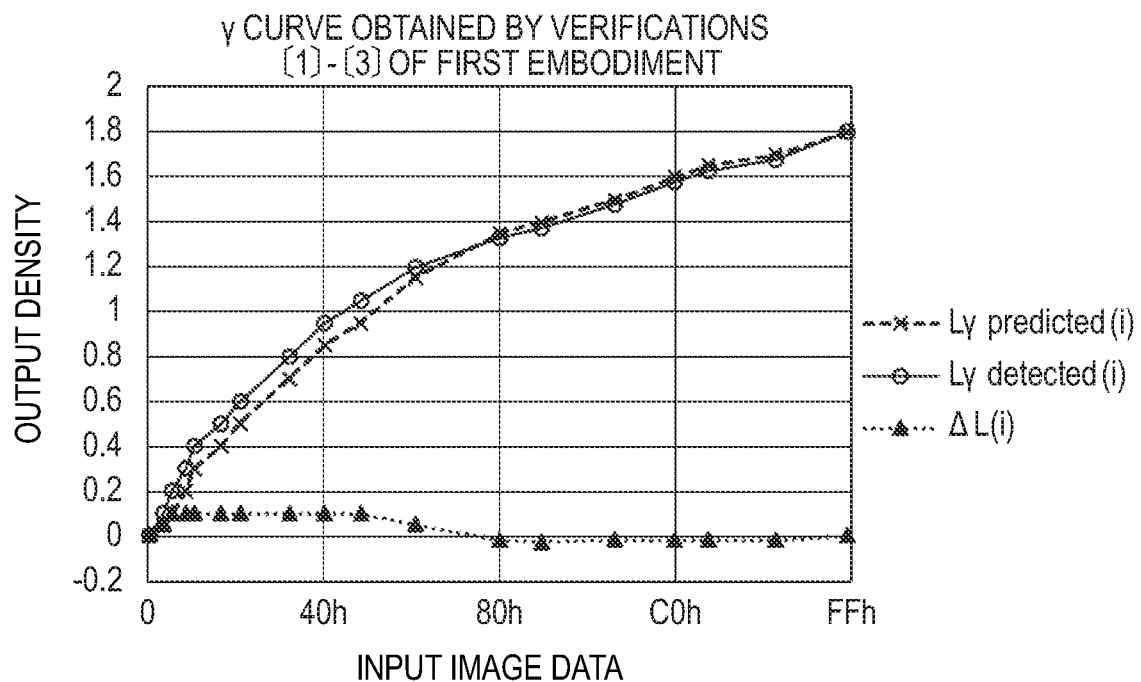
FIG. 11A and FIG. 11B are each a graph for showing a γ curve obtained by verification in the first embodiment to be disclosed.

FIG. 11A is a graph for showing the before-correction γ curve Lγpredicted(i) in the wide color gamut print mode based on the predicted density correction, the before-correction γ curve Lγdetected(i) in the wide color gamut print mode based on the detection image actual measurement, and the difference ΔL(i) that were obtained in the above-mentioned items [1] to [3], respectively. In FIG. 11A, the horizontal axis represents the input image data (i) with the vertical axis representing the density on the recording material 203 (output density), which applies to FIG. 11B referred to later. The curved line indicated by the broken line and the sign "x" indicates the before-correction γ curve Lγpredicted (i) in the wide color gamut print mode based on the predicted density correction. The curved line indicated by the solid line and the sign "○" indicates the before-correction γ curve Lγdetected(i) in the wide color gamut print mode based on the detection image actual measurement. The curved line indicated by the dotted line and the solid sign "Δ" indicates the difference ΔL(i) (=Lγdetected(i)−Lγpredicted(i)).

In the first embodiment, in the detection image actual measurement in the normal print mode and the detection image actual measurement in the wide color gamut print mode, 17 patch toner images (detection images) obtained by changing the input image data are formed on the surface of the intermediate transfer belt 205 to be detected through use of the density sensor 218. Therefore, 17 points are plotted on each line (excluding the input image data of "0"). It is understood from FIG. 11A that the before-correction γ curve Lγpredicted(i) in the wide color gamut print mode based on the predicted density correction and the before-correction γ curve Lγdetected(i) in the wide color gamut print mode based on the detection image actual measurement match each other to some extent, but partially deviate from each other.

Figure 11B:
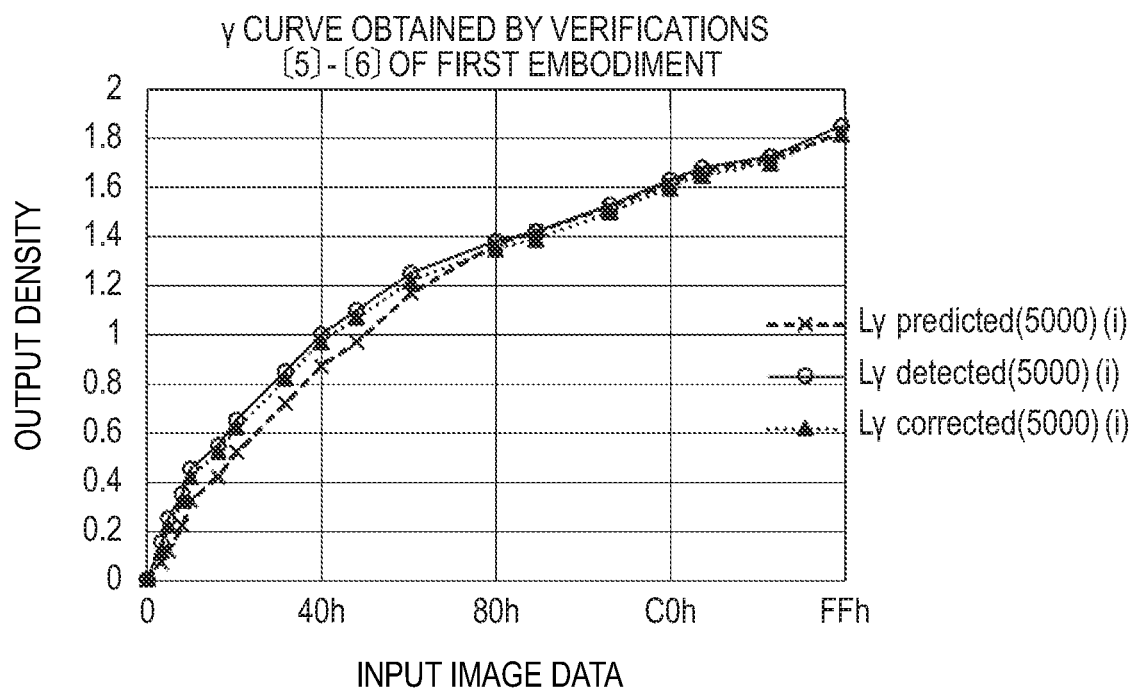

Next, the before-correction γ curve Lγpredicted(5,000)(i) in the wide color gamut print mode based on the predicted density correction, which was obtained in the items [5] to [7] after the image formation was performed on 5,000 recording materials 203 in the item [4], is shown in FIG. 11B. In addition, the before-correction γ curves Lγdetected(5,000)(i) in the wide color gamut print mode based on the detection image actual measurement and Lγcorrected(5,000)(i)+ΔL(i) are also shown in FIG. 11B. The curved line indicated by the broken line and the sign "x" indicates the before-correction γ curve Lγpredicted(5,000)(i) in the wide color gamut print mode based on the predicted density correction. The curved line indicated by the solid line and the sign "○" indicates the before-correction γ curve Lγdetected(5,000)(i) in the wide color gamut print mode based on an actual measurement density control. The curved line indicated by the dotted line and the solid sign "Δ" indicates Lγcorrected(5,000)(i)+ΔL (i). It is understood that Lγcorrected(5,000)(i)+ΔL(i), which was corrected through use of the difference ΔL(i) obtained in the item [3], is closer to the before-correction γ curve Lγdetected(5,000)(i) based on the detection image actual measurement than the before-correction γ curve Lγpredicted (5,000)(i) based on the predicted density correction. From the above-mentioned result, it was successfully verified that, when the control in the first embodiment is employed, a stable color impression can be reproduced while the frequency of performing the detection image actual measurement is reduced.

In the first embodiment, the configuration for correcting the before-correction γ curve Lγdetected(i) based on the difference ΔL(i) has been described, but the present disclosure is not limited thereto. The difference between Lγdetected(i) and Rγdetected(i) may be set as ΔL'(i), and after that, Lγcorrected(i) may be obtained from Rγdetected (i) through use of this ΔL'(i). However, the difference ΔL(i) has a value smaller than that of the difference ΔL'(i), which is advantageous in that errors and variations due to environmental variations and other such factors are small. Further, in the first embodiment, when the difference ΔL(i) is not stored in the nonvolatile memory 230, the detection image actual measurement in the wide color gamut print mode is performed to calculate the difference ΔL(i). However, even when the difference ΔL(i) is stored in the nonvolatile memory 230, the detection image actual measurement in the wide color gamut print mode may be performed as required, to thereby calculate the difference ΔL(i) again.

According to the first embodiment described above, it is possible to reduce downtime relating to the formation and detection of the detection image.

Second Embodiment

A second embodiment of the present disclosure has a feature that, in addition to the same control as in the first embodiment, the difference ΔL(i) is again calculated when image forming apparatus states are closer to each other between one exhibited at the time of performing the detection image actual measurement and one exhibited at the time of performing the predicted density correction. In this case, the fact that the image forming apparatus states are closer to each other means the following case. For example, a state in which 500 sheets have been printed by the same image forming apparatus from a given state A is set as a state B, and a state in which 1,000 sheets have been printed by the same image forming apparatus from the state A is set as a state C. It is assumed that an environment involved under the states A and C is the environment of a temperature of 23° C. and a humidity of 50%, while an environment involved under the state B is the environment of a temperature of 10° C. and a humidity of 15%. On this assumption, the state A is closer to the state C. In such a case, in the second embodiment, even when the detection image actual measurement in the wide color gamut print mode is performed under the state B, the value of the difference ΔL(i) exhibited under the state A closer to the state C is employed. The second embodiment is described below.

[Configuration of Image Forming Apparatus and Outlines of Detection Image Actual Measurement and Predicted Density Correction]

Basic configurations and operations of the image forming apparatus, the detection image actual measurement, and the predicted density correction that are to be used in the second embodiment are the same as those described in the first embodiment. Therefore, duplicate detailed descriptions in the second embodiment are omitted. The second embodiment is different from the first embodiment in points relating to the calculation of the difference ΔL(i) between the before-correction γ curve Lγdetected(i) based on the detection image actual measurement in the wide color gamut print mode and the before-correction γ curve Lγpredicted(i) based on the predicted density correction in the wide color gamut print mode. In the first embodiment, when the nonvolatile memory 230 is not stored in the difference ΔL(i) after the detection image actual measurement in the normal print mode is performed, the detection image actual measurement in the wide color gamut print mode is subsequently performed to calculate the difference ΔL(i). In that case, the accuracy of the difference ΔL(i) between the predicted density correction and the detection image actual measurement in the wide color gamut print mode is satisfactory, but the detection image actual measurement in the wide color gamut print mode is performed along with the detection image actual measurement in the normal print mode, which leads to a fear that long downtime may occur. Some users may wish to place a higher priority on short downtime than on the accuracy of density control, and hence it is conceivable to set a timing to perform the detection image actual measurement in the wide color gamut print mode to a freely-selected timing designated by the user. However, in such a case, the following problem occurs.

After the detection image actual measurement in the normal print mode is performed, the predicted density correction in the wide color gamut print mode is performed. In some cases, the state of the image forming apparatus 200 exhibited when the predicted density correction in the wide color gamut print mode is performed is different from the state of the image forming apparatus 200 exhibited when the detection image actual measurement in the wide color gamut print mode is performed at the timing designated by the user. In such a case, the accuracy of the calculated difference ΔL(i) deteriorates. Originally, the difference ΔL(i) to be calculated indicates an individual difference in the image forming apparatus 200 including the cartridge. However, when a timing to perform the predicted density correction in the wide color gamut print mode and the timing to perform the detection image actual measurement in the wide color gamut print mode are different, the difference ΔL(i) involves changes due to, for example, variations ascribable to the progress of use and environmental variations. In the second embodiment, in consideration of such a problem, the state of the image forming apparatus 200 exhibited at the time of performing the predicted density correction in the wide color gamut print mode and the state of the image forming apparatus 200 exhibited at the time of performing the detection image actual measurement in the wide color gamut print mode are compared with each other, and the difference ΔL(i) exhibited when the states are the closest to each other is employed as the correction value. The controller 201 stores the before-correction γ curve Lγdetected(i) exhibited at the time of performing the detection image actual measurement and the difference ΔL(i) in the nonvolatile memory 230, and information relating to the image forming apparatus state exhibited when the difference ΔL(i) was calculated is also stored in association with the difference ΔL(i).

Further, in the second embodiment, the timing to perform the detection image actual measurement is set to the freely-selected timing designated by the user. The image forming apparatus 200 includes the operating unit 300 serving as a designation unit, and the user designates the timing to perform the detection image actual measurement through the operating unit 300. The operating unit 300 is, for example, a touch panel liquid crystal display. In another case, the user may designate the timing through a printer driver running on a personal computer or other such external apparatus connected to the image forming apparatus 200.

[Regarding Density Control in Second Embodiment]

A control procedure in the second embodiment is described with reference to the flow chart illustrated in FIG. 12. The description is followed by the verification of the effects. When the image forming apparatus 200 is activated, the controller 201 performs processing of Step S12 and the subsequent steps. In Step S12, the controller 201 performs the detection image actual measurement in the normal print mode. With this processing, the before-correction γ curve Rγdetected(i) in the normal print mode is calculated while the γ correction at the time of the normal print mode is performed.

In Step S13, the controller 201 calculates the following value from such correlation tables as shown in FIG. 7A, FIG. 7B, and FIG. 8B based on parameters including the circumferential speed difference of the developing roller 303 exhibited when the detection image actual measurement is performed, the degree of use of the drum unit 310, and the degree of toner consumption. That is, the controller 201 calculates Lγpredicted(i) from the before-correction γ curves Rγdetected(i) and ΔLpredicted(i) in order to obtain the before-correction γ curve in the wide color gamut print mode based on the predicted density correction. Details of Lγpredicted(i) are as described in the first embodiment.

In Step S14, the controller 201 determines whether the difference ΔL(i) is stored in the nonvolatile memory 230. Details of the difference ΔL(i) are as described in the first embodiment.

When determining in Step S14 that the difference ΔL(i) is not stored in the nonvolatile memory 230, the controller 201 advances the processing to Step S15. In Step S15, the controller 201 determines whether it is designated by the user to perform the detection image actual measurement in the wide color gamut print mode. When determining in Step S15 that it is designated by the user to avoid performing the detection image actual measurement in the wide color gamut print mode, the controller 201 advances the processing to Step S16. In Step S16, the controller 201 recreates a look-up table (performs the γ correction) from the before-correction γ curve Lγpredicted(i) in the wide color gamut print mode based on the predicted density correction, which is calculated in Step S13, and performs the image formation in the wide color gamut print mode to bring the processing to an end. In the processing of Step S16, the detection image actual measurement is not performed, and the difference ΔL(i) is not stored in the nonvolatile memory 230, to thereby avoid performing the correction of the before-correction γ curve Lγpredicted(i) based on the difference ΔL(i) as well.

When determining in Step S15 that it is designated by the user to perform the detection image actual measurement in the wide color gamut print mode, the controller 201 advances the processing to Step S17. In Step S17, the controller 201 performs the detection image actual measurement in the wide color gamut print mode to calculate the before-correction γ curve Lγdetected(i). The controller 201 stores the calculated before-correction γ curve Lγdetected(i) and the information indicating the current state of the image forming apparatus 200 in the nonvolatile memory 230. In Step S18, the controller 201 calculates the difference ΔL(i) from the before-correction γ curve Lγdetected(i) in the wide color gamut print mode based on the detection image actual measurement, which is calculated in Step S17, and the before-correction γ curve Lγpredicted(i) in the wide color gamut print mode based on the predicted density correction, which is calculated in Step S13. In this case, the difference ΔL(i) is expressed by Lγdetected(i)–Lγpredicted(i). In Step S19, the controller 201 calculates Lγcorrected(i) (=Lγpredicted(i)+ΔL(i)). In Step S20, the controller 201 recreates a look-up table from Lγcorrected(i) calculated in Step S19 (performs the γ correction), and performs the image formation in the wide color gamut print mode to bring the processing to an end.

When determining in Step S14 that the difference ΔL(i) is stored in the nonvolatile memory 230, the controller 201 advances the processing to Step S21. In Step S21, the controller 201 determines whether it is designated by the user to perform the detection image actual measurement in the wide color gamut print mode. When determining in Step S21 that it is designated by the user to avoid performing the detection image actual measurement in the wide color gamut print mode, the controller 201 advances the processing to Step S19. In Step S19, the controller 201 uses the difference ΔL(i) stored in the nonvolatile memory 230 to calculate Lγcorrected(i) without performing the detection image actual measurement. The subsequent processing steps have been described above, and descriptions thereof are omitted.

When determining in Step S21 that it is designated by the user to perform the detection image actual measurement in the wide color gamut print mode, the controller 201 advances the processing to Step S22. In Step S22, the controller 201 performs the detection image actual measurement in the wide color gamut print mode to calculate the before-correction γ curve Lγdetected(i). The controller 201 stores the calculated before-correction γ curve Lγdetected(i) and the information indicating the current state of the image forming apparatus 200 in the nonvolatile memory 230.

In Step S23, the controller 201 performs the following processing in order to determine whether the difference ΔL(i) is required to be updated. That is, it is determined which image forming apparatus state is the closest to the image forming apparatus state exhibited when the current Lγpredicted(i) was obtained from among the image forming apparatus states exhibited when the detection image actual measurement in the wide color gamut print mode was performed in the past and the image forming apparatus state exhibited in Step S22, which are stored in the nonvolatile memory 230. Specifically, the controller 201 successively compares the current image forming apparatus state with a plurality of image forming apparatus states in the past and the image forming apparatus state exhibited in Step S22, which are stored in the nonvolatile memory 230, and identifies Lγdetected(i) associated with the image forming apparatus state closest to the image forming apparatus state exhibited in Step S22 from among those image forming apparatus states.

As described above, in order to obtain the difference ΔL(i) exhibiting high accuracy, it is originally required to perform the detection image actual measurement along with the predicted density correction. However, in order to place a higher priority on short downtime, when the above-mentioned control cannot be performed together, the difference ΔL(i) (=Lγdetected(i)–Lγpredicted(i)) is calculated under the condition that the states of the image forming apparatus 200 are closer to each other as much as possible. Therefore, in the second embodiment, the accuracy of the difference ΔL(i) can be improved.

(Regarding Information Indicating Image Forming Apparatus State)

In the second embodiment, the following three indicators are defined so as to indicate the state of the image forming apparatus 200. Then, a "distance index" is calculated as an index indicating how close the states of the image forming apparatus 200 exhibited when the predicted density correction and the detection image actual measurement are performed are to each other. It is determined how close the states of the image forming apparatus 200 are to each other based on factors that change over time.

A. (difference in number of printed sheets)÷(number of printed sheets (for example, 5,000 sheets in the second embodiment) that cause the output density to vary by 0.1).

B. (difference in absolute moisture content under the installation environment of the image forming apparatus)÷(change in absolute moisture content (for example, 2.5 g/m3 in the second embodiment) that causes the output density to vary by 0.1).

C. (difference in photosensitive drum temperature)÷(change in photosensitive drum temperature (for example, 5° C. in the second embodiment) that causes the output density to vary by 0.1).

In this case, the indicator A indicates a change in density due to the deterioration of the image forming apparatus 200 caused by performing printing on the recording materials 203. The indicator B indicates a change in density due to variations in installation environment of the image forming apparatus 200. The indicator C indicates a change in density due to a change in photosensitive drum potential (surface potential of the photosensitive drum) caused when the resistance of the photosensitive drum 301 is changed due to a change in temperature of the photosensitive drum 301. Each of those indicators is normalized by dividing the difference by the condition that causes the output density to vary by 0.1. The before-correction γ curve Lγdetected(i) involving the smallest total value of those indicators A to C is used to calculate the difference ΔL(i), to thereby be able to improve the accuracy in calculating the difference ΔL(i).

Figure 12:
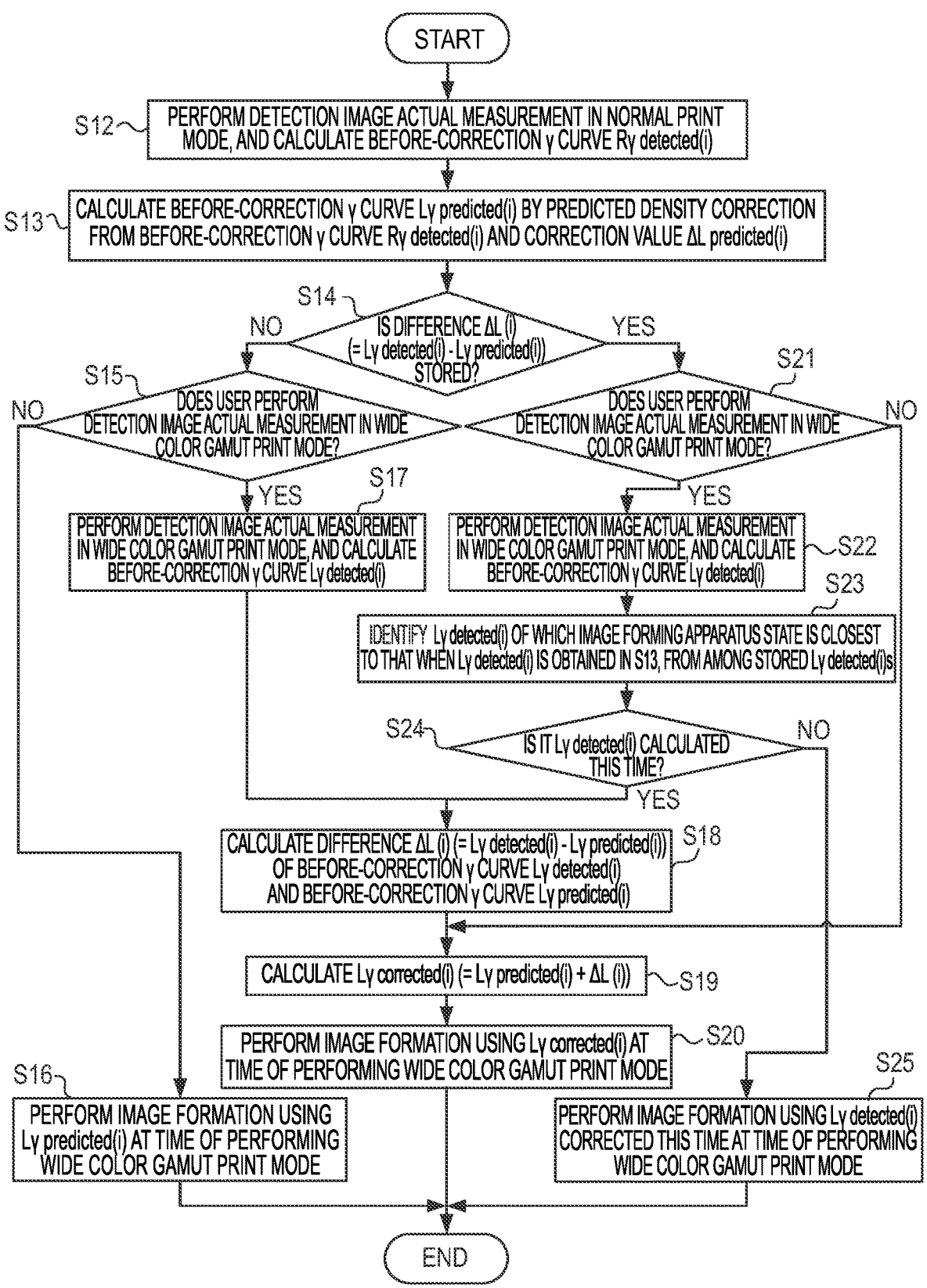
FIG. 12 is a flow chart for illustrating a control method for density correction in the second embodiment to be disclosed.

Referring back to the description of the flow chart of FIG. 12, in Step S24, the controller 201 determines whether the before-correction γ curve Lγdetected(i) selected (extracted) in Step S23 is the before-correction γ curve Lγdetected(i) calculated this time by performing the detection image actual measurement in Step S22. When determining in Step S24 that Lγdetected(i) selected in Step S23 is not Lγdetected (i) calculated this time, the controller 201 advances the processing to Step S25. In Step S25, the controller 201 recreates a look-up table for correcting the γ curve into a target γ curve (performs the γ correction) from the before-correction γ curve Lγdetected(i) calculated based on the detection image actual measurement in Step S22. The image forming apparatus then uses the look-up table to perform the image formation in the wide color gamut print mode to bring the processing to an end. In this manner, when the detection image actual measurement is performed in the wide color gamut print mode before the image formation is performed in the wide color gamut print mode, the before-correction γ curve Lγdetected(i) obtained based on the actual measurement is used, to thereby be able to perform the image formation with high accuracy.

When determining in Step S24 that Lγdetected(i) selected in Step S23 is the before-correction γ curve Lγdetected(i) calculated this time by performing the detection image actual measurement in Step S22, the controller 201 advances the processing to Step S18. In Step S18, the controller 201 calculates the difference ΔL(i) from the before-correction γ curve Lγdetected(i) based on the detection image actual measurement, which is calculated in Step S22, and the before-correction γ curve Lγpredicted(i) based on the predicted density correction, which is calculated in Step S13. In other words, the controller 201 updates the difference ΔL(i). The controller 201 stores the updated difference ΔL(i) in the nonvolatile memory 230. In Step S19, the controller 201 uses the difference ΔL(i) calculated in Step S18 to calculate Lγcorrected(i). In Step S20, the controller 201 recreates a look-up table (performs the γ correction) from Lγcorrected (i) calculated in Step S19, and performs the image formation in the wide color gamut print mode to bring the processing to an end.

The controller 201 may be configured to monitor whether the detection image actual measurement in the normal print mode is to be performed in parallel with the processing from Step S17 to Step S25. When determining that the detection image actual measurement in the normal print mode is to be performed during the processing from Step S17 to Step S25, the controller 201 may perform the processing of Step S2 and the subsequent steps in FIG. 10. In this case, when determining that the density has been greatly changed, the controller 201 determines that the detection image actual measurement in the normal print mode is to be performed. The case in which the density has been greatly changed corresponds to, for example, a case in which the number of sheets on which an image has been formed has exceeded a predetermined number of sheets since the detection image actual measurement in the normal print mode was performed last or case in which environmental variations have occurred.

[Verification of Effects]

Verification as to how much difference occurs in the accuracy of density control was performed between the above-mentioned case in which the density control is performed by employing the control in the second embodiment and a case in which the density control is performed by only the predicted density correction. For this verification, a method of performing examination in the following order while varying the installation environment of the image forming apparatus was employed.

[1] Under the environment of a temperature of 23° C. and a humidity of 50% (with the absolute moisture content being 8.9 g/m3), the detection image actual measurement in the normal print mode is performed to obtain the before-correction γ curve Lγpredicted(i) based on the predicted density correction in the wide color gamut print mode. In addition, the detection image actual measurement in the wide color gamut print mode is performed together to obtain the before-correction γ curve Lγdetected(i).

[2] In order to cause a change in color impression of the image forming apparatus 200, the installation environment is changed to an environment of a temperature of 23° C. and a humidity of 55% (with the absolute moisture content being 9.8 g/m3). As the above-mentioned "distance index", the indicator B is employed, and (9.8−8.9)/2.5=0.36 is obtained.

[3] The detection image actual measurement in the wide color gamut print mode is performed to obtain a before-correction γ curve Lγdetected(1)(i). In this case, the before-correction γ curve obtained after the installation environment is changed is expressed as Lγdetected(1)(i) in distinction from the before-correction γ curve Lγdetected(i) of the item [1].

[4] A difference ΔL1(i) is obtained from the before-correction γ curve Lγpredicted(i) in the wide color gamut print mode based on the predicted density correction ([1]) and the before-correction γ curve Lγdetected(1)(i) in the wide color gamut print mode based on the detection image A ([3]). In this case, the difference is expressed as ΔL1(i) in order to clarify that the difference is obtained based on the before-correction γ curve Lγdetected(1)(i) obtained in the item [3].

[5] In order to cause a change in color impression of the image forming apparatus 200, the installation environment is changed to an environment of a temperature of 24° C. and a humidity of 60% (with the absolute moisture content being 11.3 g/m3). As the "distance index", the indicator B is employed, and (11.3−8.9)/2.5=0.96 is obtained. That is, the distance index (=0.96) becomes larger this time than the distance index (=0.36) of the item [2].

[6] The detection image actual measurement in the wide color gamut print mode is performed to obtain a before-correction γ curve Lγdetected(2)(i). In this case, the before-correction γ curve obtained after the installation environment is further changed is expressed as Lγdetected(2)(i) in distinction from the before-correction γ curve Lγdetected(i) of the item [1] and the before-correction γ curve Lγdetected (1)(i) of the item [3].

[7] A difference ΔL2(i) is obtained from the before-correction γ curve Lγpredicted(i) in the wide color gamut print mode based on the predicted density correction ([1]) and the before-correction γ curve Lγdetected(2)(i) in the wide color gamut print mode based on the detection image actual measurement ([6]). In this case, the difference is expressed as ΔL2(i) in order to clarify that the difference is obtained based on the before-correction γ curve Lγdetected(2)(i) obtained in the item [6].

[8] The before-correction γ curve Lγpredicted(i) in the wide color gamut print mode based on the predicted density correction, which is obtained in the item [1], is corrected based on the difference ΔL1(i) obtained in the item [4] to obtain Lγcorrected(1)(i) (=Lγpredicted(i)+ΔL1(i)). The before-correction γ curve Lγpredicted(i) in the wide color gamut print mode based on the predicted density correction, which is obtained in the item [1], is also corrected based on the difference ΔL2(i) obtained in the item [7] to obtain Lγcorrected(2)(i) (=Lγpredicted(i)+ΔL2(i)). It is then examined which one of Lγcorrected(1)(i) and Lγcorrected(2)(i) is closer to the before-correction γ curve Lγdetected(i) in the wide color gamut print mode based on the detection image actual measurement, which is obtained in the item [1].

FIG. 13 is a graph for showing the before-correction γ curve Lγpredicted(i) in the wide color gamut print mode based on the predicted density correction and the before-correction γ curve Lγdetected(i) in the wide color gamut print mode based on the detection image actual measurement, which are obtained by the above-mentioned verification. In FIG. 13, Lγcorrected(1)(i) (=Lγpredicted(i)+ΔL1(i)) and Lγcorrected(2)(i) (=Lγpredicted(i)+ΔL2(i)) are also shown. In FIG. 13, the horizontal axis represents the input image data, and the vertical axis represents the output density on the recording material 203. The curved line indicated by the broken line and the sign "x" indicates the before-correction γ curve Lγpredicted(i) in the wide color gamut print mode based on the predicted density correction. The curved line indicated by the solid line and the sign "○" indicates the before-correction γ curve Lγdetected(i) in the wide color gamut print mode based on the detection image actual measurement. The curved line indicated by the dotted line and the solid sign "▲" indicates Lγcorrected(1)(i) (=Lγpredicted(i)+ΔL1(i)). The curved line indicated by the broken line and the sign "0" indicates Lγcorrected(2)(i) (=Lγpredicted(i)+ΔL2(i)). In FIG. 13, the low density side (0h to 80h of the input image data), which exhibits a large density difference, is enlarged for the sake of easy viewing.

As shown in FIG. 13, the result indicates that Lγcorrected(1)(i) (=Lγpredicted(i)+ΔL1(i)) relating to a small distance index is closer to the before-correction γ curve Lγdetected(i) of the item [1] than Lγcorrected(2)(i) (=Lγpredicted(i)+ΔL2(i)) relating to a large distance index. It was successfully verified from the above-mentioned result that, when the control in the second embodiment is employed, a stable color impression can be reproduced while the frequency of performing the detection image actual measurement is reduced even in a case where neither the predicted density correction nor the actual measurement density control can be performed.

There are no particular limitations imposed on the indicator indicating the state of the image forming apparatus 200 described in the second embodiment, and an optimum configuration may be employed in accordance with the image forming apparatus to be used. Further, in the second embodiment, the difference ΔL(i) is again calculated when the detection image actual measurement in the wide color gamut print mode is performed, but may be again calculated when, for example, the predicted density correction is performed.

According to the second embodiment described above, the reduction of downtime relating to the formation and detection of the detection image can be further achieved in response to demand from users.

Third Embodiment

A third embodiment of the present disclosure relates to the same control as that in the first embodiment except for the following point. That is, the γ curve is used to calculate the difference ΔL(i) in the first embodiment and the second embodiment, while the LUT (look-up table) is used for the calculation in the third embodiment.

[Outline of Configuration of Image Forming Apparatus]

Basic configurations and operations of the image forming apparatus, the detection image actual measurement, and the predicted density correction that are to be used in the third embodiment are the same as those described in the first embodiment. Therefore, duplicate detailed descriptions in the third embodiment are omitted.

[Regarding Density Control in Third Embodiment]

Now, a method of calculating a difference between the predicted density correction and the detection image actual measurement in the third embodiment through use of a look-up table (LUT) different from that in the first embodiment to correct the predicted density correction information is described with reference to the flowchart illustrated in FIG. 14. When the image forming apparatus 200 is activated, the controller 201 starts processing of Step S31 and the subsequent steps. In Step S31, the controller 201 performs the detection image actual measurement in the normal print mode to perform the γ correction at the time of the normal print mode, and obtains a look-up table $R_{LUT}$detected(i) in the normal print mode. This look-up table $R_{LUT}$detected(i) corresponds to a first conversion unit.

In Step S32, the controller 201 obtains a correction value $\Delta L_{LUT}$predicted of the look-up table $R_{LUT}$detected(i) in the following manner. That is, the controller 201 obtains a correction value $\Delta L_{LUT}$predicted(i) in the case of effecting the wide color gamut print mode from such correlation tables as shown in FIG. 7A, FIG. 7B, and FIG. 8B based on parameters including the circumferential speed difference of the developing roller 303 exhibited when the detection image actual measurement is performed, the degree of use of the drum unit 310, and the degree of toner consumption. A before-correction look-up table $L_{LUT}$predicted(i) based on the predicted density correction in the wide color gamut print mode is expressed by the following expression.

$$L_{LUT}\text{predicted}(i)=R_{LUT}\text{detected}(i)+\Delta L_{LUT}\text{predicted}(i) \quad \text{Expression (4)}$$

In Step S33, the controller 201 determines whether a difference $\Delta L_{LUT}(i)$ is stored in the nonvolatile memory 230 mounted to the image forming apparatus 200. In this case, the difference $\Delta L_{LUT}(i)$ refers to a difference ($L_{LUT}$detected(i)−$L_{LUT}$predicted(i)) between a before-correction look-up table $L_{LUT}$detected(i) based on the detection image actual measurement in the wide color gamut print mode and the before-correction look-up table $L_{LUT}$predicted(i) based on the predicted density correction in the wide color gamut print mode. In this case, the before-correction look-up table $L_{LUT}$detected(i) corresponds to a conversion unit. In addition, the difference $\Delta L_{LUT}(i)$ corresponds to correction information.

As described above, it is highly possible that the accuracy of the detection image actual measurement using the density sensor 218 is superior to that of the predicted density correction in which it is difficult to correct individual differences. When the before-correction look-up table $L_{LUT}$detected(i) in the wide color gamut print mode based on the detection image actual measurement is present, the difference is used to correct the before-correction look-up table $L_{LUT}$predicted(i) based on the predicted density correction in the wide color gamut print mode. With this configuration, it is possible to correct the individual difference of the image forming apparatus 200. The expression of the difference $\Delta L_{LUT}(i)$ is expressed by Expression (5).

$$\Delta L_{LUT}(i) = L_{LUT}\text{detected}(i) - L_{LUT}\text{predicted}(i) \quad \text{Expression (5)}$$

When determining in Step S33 that the difference $\Delta L_{LUT}(i)$ is not stored, the controller 201 advances the processing to Step S34. In Step S34, the controller 201 performs the detection image actual measurement in the wide color gamut print mode. In Step S35, the controller 201 uses Expression (5) to calculate the difference $\Delta L_{LUT}(i)$. In Step S36, the controller 201 corrects the before-correction look-up table $L_{LUT}$predicted(i) based on the predicted density correction in the wide color gamut print mode. The corrected look-up table is set as $L_{LUT}$corrected(i). The correction expression to be used is Expression (6).

$$L_{LUT}\text{corrected}(i) = L_{LUT}\text{predicted}(i) + \Delta L_{LUT}(i) \quad \text{Expression (6)}$$

The predicted density correction and the detection image actual measurement in the wide color gamut print mode are performed simultaneously. Therefore, $L_{LUT}$corrected(i) $=L_{LUT}$detected(i) is established immediately after the detection image actual measurement is performed. After that, the predicted density correction is performed, to thereby update $L_{LUT}$predicted(i) and update $L_{LUT}$corrected(i) as well.

When determining in Step S33 that $\Delta L_{LUT}(i)$ is stored after the detection image actual measurement in the wide color gamut print mode was performed in the past, the controller 201 advances the processing to Step S36. In Step S37, the controller 201 uses $L_{LUT}$coffected(i) calculated by Expression (6) in Step S36 to perform the image formation when the user performs the wide color gamut print mode. In Step S38, the controller 201 determines whether the condition for performing the detection image actual measurement in the normal print mode has been satisfied. When determining in Step S38 that the condition for performing the detection image actual measurement has been satisfied, the controller 201 returns the processing to Step S31. When determining in Step S38 that the condition for performing the detection image actual measurement has not been satisfied, the controller 201 returns the processing to Step S37, and uses the look-up table obtained in Step S37 to perform the image formation until the detection image actual measurement is performed. The detection image actual measurement is performed when it is feared that the image forming apparatus 200 may have the color impression changed due to sheet-passing endurance, the replacement of the cartridge, or a change in use environment, and when a performing condition for the detection image actual measurement in the normal print mode is satisfied, the controller 201 advances to the processing of Step S31 again.

There are no particular limitations imposed on the configurations of the detection image actual measurement and the predicted density correction described in the third embodiment, and an optimum configuration may be employed in accordance with the image forming apparatus to be used. In the third embodiment, when the difference $\Delta L_{LUT}(i)$ is not stored, the detection image actual measurement in the wide color gamut print mode is performed to calculate $\Delta L_{LUT}(i)$. However, even when the difference $\Delta L_{LUT}(i)$ is stored, density correction may be performed as required, to thereby calculate the difference $\Delta L_{LUT}(i)$ again.

According to the third embodiment described above, the reduction of downtime relating to the formation and detection of the detection image can be further achieved in response to demand from users.

Other Embodiment

In the first embodiment and the second embodiment, L$\gamma$predicted(i) in the wide color gamut print mode is obtained from R$\gamma$detected(i) in the normal print mode, and L$\gamma$detected(i) is further obtained to obtain the difference $\Delta L(i)$. When, for example, the difference $\Delta L(i)$ is stored in the nonvolatile memory 230, the difference $\Delta L(i)$ is used to correct L$\gamma$predicted(i) and obtain L$\gamma$corrected(i). However, L$\gamma$corrected(i) may be obtained based on a difference between L$\gamma$detected(i) in the wide color gamut print mode and R$\gamma$detected(i) in the normal print mode. In this case, L$\gamma$corrected(i) is obtained by, for example, the following expression.

$$L\gamma\text{corrected}(i) = R\gamma\text{detected}(i) + (L\gamma\text{detected}(i) - R\gamma\text{detected}(i))$$

In order to calculate the difference, the value obtained under the same condition or as close a condition as possible is used to increase the accuracy. Therefore, it is to be understood that the accuracy is higher when the difference $\Delta L(i)$ is used than when the difference (L$\gamma$detected(i)−R$\gamma$detected(i)) is used.

The same applies to a method of using the look-up table in the third embodiment.

According to the other embodiment described above, the reduction of downtime relating to the formation and detection of the detection image can be further achieved in response to demand from users.

Although the exemplary embodiments of the present disclosure have been described so far, the present disclosure is by no means limited to those embodiments, and hence various changes and modifications can be made within the scope of the subject matter of the present disclosure.

Further, the present disclosure is also achieved by performing processing for supplying software (a program) for implementing the above-mentioned functions in the embodiments to a system or an apparatus through a network or each of different kinds of storage media and causing a computer (or, for example, a CPU or an MPU) of the system or the apparatus to read and perform the program.

According to the present disclosure, it is possible to reduce downtime relating to the formation and detection of the detection image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application is a continuation application of U.S. patent application Ser. No. 16/728,421, filed Dec. 27, 2019, which is a continuation application of U.S. patent application Ser. No. 16/194,811, filed Nov. 19, 2018, which claims the benefit of Japanese Patent Application No. 2017-223072, filed Nov. 20, 2017, which are hereby incorporated by reference herein in their entirety.

What is claimed is:
1. An image forming apparatus, comprising:
a photosensitive drum;
a developing roller configured to develop an electrostatic latent image on the photosensitive drum with toner to form a toner image;
a belt onto which the toner image formed on the photosensitive drum is to be transferred or on which a recording material, onto which the toner image is to be transferred, is borne;

a detector configured to emit light to a detection image formed on the belt and receive reflected light from the detection image;

an exposure unit configured to form an electrostatic image on the photosensitive drum by exposing a surface of the photosensitive drum at a predetermined exposure amount and by forming a light-part potential from a dark-part potential on the photosensitive drum;

a high-voltage power supply configured to apply a developing voltage to the developing roller; and a controller configured to perform a first detection image actual measurement for obtaining a first characteristic indicating a relationship between input image data in a first mode and a density corresponding to the input image data based on a detection result of the reflected light by the detector in the first mode in which a first development contrast is formed between the developing voltage applied to the developing roller and the light-part potential formed on the photosensitive drum, wherein the detector is configured to emit the light to the detection image formed on the belt and receive the reflected light from the detection image in a second mode in which a second development contrast is formed between the developing voltage applied to the developing roller and the light-part potential formed on the photosensitive drum and is greater than the first development contrast, and in which image formation is performed with a color gamut different from a color gamut in the first mode, and wherein the controller is configured to perform a second detection image actual measurement for obtaining a second characteristic indicating a relationship between the input image data in the second mode and the density corresponding to the input image data based on the detection result of the reflected light.

2. The image forming apparatus according to claim 1, further comprising a designation unit configured to designate whether the second detection image actual measurement is to be performed, wherein in a case in which the designation unit designates to perform the second detection image actual measurement, the controller is configured to perform the second detection image actual measurement.

3. The image forming apparatus according to claim 1, wherein the controller is configured to predict the second characteristic based on the detection result of the reflected light by the detector in the first mode and the detection result of the reflected light by the detector in the second mode.

* * * * *